(12) United States Patent
Tanaka et al.

(10) Patent No.: US 9,561,490 B2
(45) Date of Patent: Feb. 7, 2017

(54) METHOD FOR MANUFACTURING TITANIA COATED ALUMINA FIBER AGGREGATE

(71) Applicant: K2R Co., Ltd., Kitakyushu-shi, Fukuoka (JP)

(72) Inventors: Kenichiro Tanaka, Kitakyushu (JP); Licca Tanaka, Kitakyushu (JP); Tsutomu Harada, Fujisawa (JP)

(73) Assignee: K2R CO., LTD., Fukuoka (JP)

( * ) Notice: Subject to any disclaimer, the term of this patent is extended or adjusted under 35 U.S.C. 154(b) by 440 days.

(21) Appl. No.: 14/033,943

(22) Filed: Sep. 23, 2013

(65) Prior Publication Data

US 2014/0194274 A1   Jul. 10, 2014

Related U.S. Application Data

(63) Continuation-in-part of application No. 11/988,077, filed as application No. PCT/JP2006/313152 on Jun. 30, 2006, now abandoned.

(30) Foreign Application Priority Data

Jun. 30, 2005  (JP) .................................. 2005-191172
Feb. 20, 2006  (JP) .................................. 2006-043147

(51) Int. Cl.
  *B01J 21/06*   (2006.01)
  *B01J 37/08*   (2006.01)
  (Continued)

(52) U.S. Cl.
  CPC .............. *B01J 21/063* (2013.01); *B01D 53/88* (2013.01); *B01J 21/04* (2013.01); *B01J 35/004* (2013.01);
  (Continued)

(58) Field of Classification Search
  None
  See application file for complete search history.

(56) References Cited

U.S. PATENT DOCUMENTS 4,940,675 A *  7/1990  Bohlayer ................ C03B 19/12
                                                                501/12
5,055,348 A   10/1991  Kataoka et al.
(Continued)

FOREIGN PATENT DOCUMENTS

DE   41 39 679    6/1993
EP   0 258 547    3/1988
(Continued)

OTHER PUBLICATIONS

Translation of JP2002-263176, Suzuki et al., Retrieved Mar. 1, 2016, pp. 1-19, Original Japanese Published Sep. 17, 2002.*
(Continued)

*Primary Examiner* — Francisco Tschen
(74) *Attorney, Agent, or Firm* — Norris McLaughlin & Marcus, P.A.

(57) ABSTRACT

Provided is a method for manufacturing a titania coated alumina fiber aggregate which includes the steps of: forming an aluminum fiber aggregate where aluminum fibers are aggregated with density per unit volume of 0.5 g/cm$^3$ to 3 g/cm$^3$; forming an alumina fiber aggregate where an oxide film having a film thickness of 50 nm or more is formed on alumina fibers; and forming a titania coated alumina fiber aggregate where a titania thin film is formed on alumina fibers.

3 Claims, 19 Drawing Sheets

(51) Int. Cl.
| | |
|---|---|
| *C04B 35/10* | (2006.01) |
| *B01J 37/02* | (2006.01) |
| *B01J 21/04* | (2006.01) |
| *B01J 35/00* | (2006.01) |
| *B01J 35/06* | (2006.01) |
| *C04B 30/02* | (2006.01) |
| *C04B 35/46* | (2006.01) |
| *C04B 41/00* | (2006.01) |
| *C04B 41/50* | (2006.01) |
| *C23C 8/10* | (2006.01) |
| *C23C 8/80* | (2006.01) |
| *C23C 28/04* | (2006.01) |
| *B01D 53/88* | (2006.01) |
| *C02F 1/32* | (2006.01) |
| *C02F 1/72* | (2006.01) |
| *C04B 111/00* | (2006.01) |
| *B82Y 40/00* | (2011.01) |

(52) U.S. Cl.
CPC ............ *B01J 35/06* (2013.01); *B01J 37/0226* (2013.01); *B01J 37/08* (2013.01); *C04B 30/02* (2013.01); *C04B 35/10* (2013.01); *C04B 35/46* (2013.01); *C04B 41/009* (2013.01); *C04B 41/5041* (2013.01); *C23C 8/10* (2013.01); *C23C 8/80* (2013.01); *C23C 28/04* (2013.01); *C23C 28/042* (2013.01); *B01D 2255/802* (2013.01); *B01D 2257/404* (2013.01); *B82Y 40/00* (2013.01); *C02F 1/32* (2013.01); *C02F 1/725* (2013.01); *C02F 2305/023* (2013.01); *C02F 2305/10* (2013.01); *C04B 2111/00827* (2013.01)

(56) References Cited

U.S. PATENT DOCUMENTS

| | | | |
|---|---|---|---|
| 6,733,875 B1* | 5/2004 | Takano | B32B 5/18 427/373 |
| 6,770,257 B1* | 8/2004 | Imura | B01J 21/063 423/610 |
| 2004/0211538 A1 | 10/2004 | Lorenz et al. | |

FOREIGN PATENT DOCUMENTS

| | | |
|---|---|---|
| EP | 0 358 309 | 3/1990 |
| JP | 62-235246 | 10/1987 |
| JP | 7-96202 | 4/1995 |
| JP | 10-089050 | 4/1998 |
| JP | 11-279843 | 10/1999 |
| JP | 2001-218820 | 8/2001 |
| JP | 2005-163243 | 6/2005 |
| WO | WO-98/40534 | 9/1998 |
| WO | WO-02/36844 | 5/2002 |

OTHER PUBLICATIONS

Harizanov et al. (Development and investigation of sol-gel solutions for the formation of TiO2 coatings, Solar energy Materials and Solar Cells, vol. 63, Issue 2, Jul. 1, 2000, pp. 185-195).*

Nov. 15, 2003 "Novel method of developing oxide coating on aluminum using microwave heating." S. Das et al. Journal of Material Science Letters. vol. 22, pp. 1635-1637.

M.S. Hunter, et al., "Natural and Thermally Formed Oxide Films on Aluminum", Journal of the Electrochemical Society, Sep. 1956, pp. 482-485.

* cited by examiner

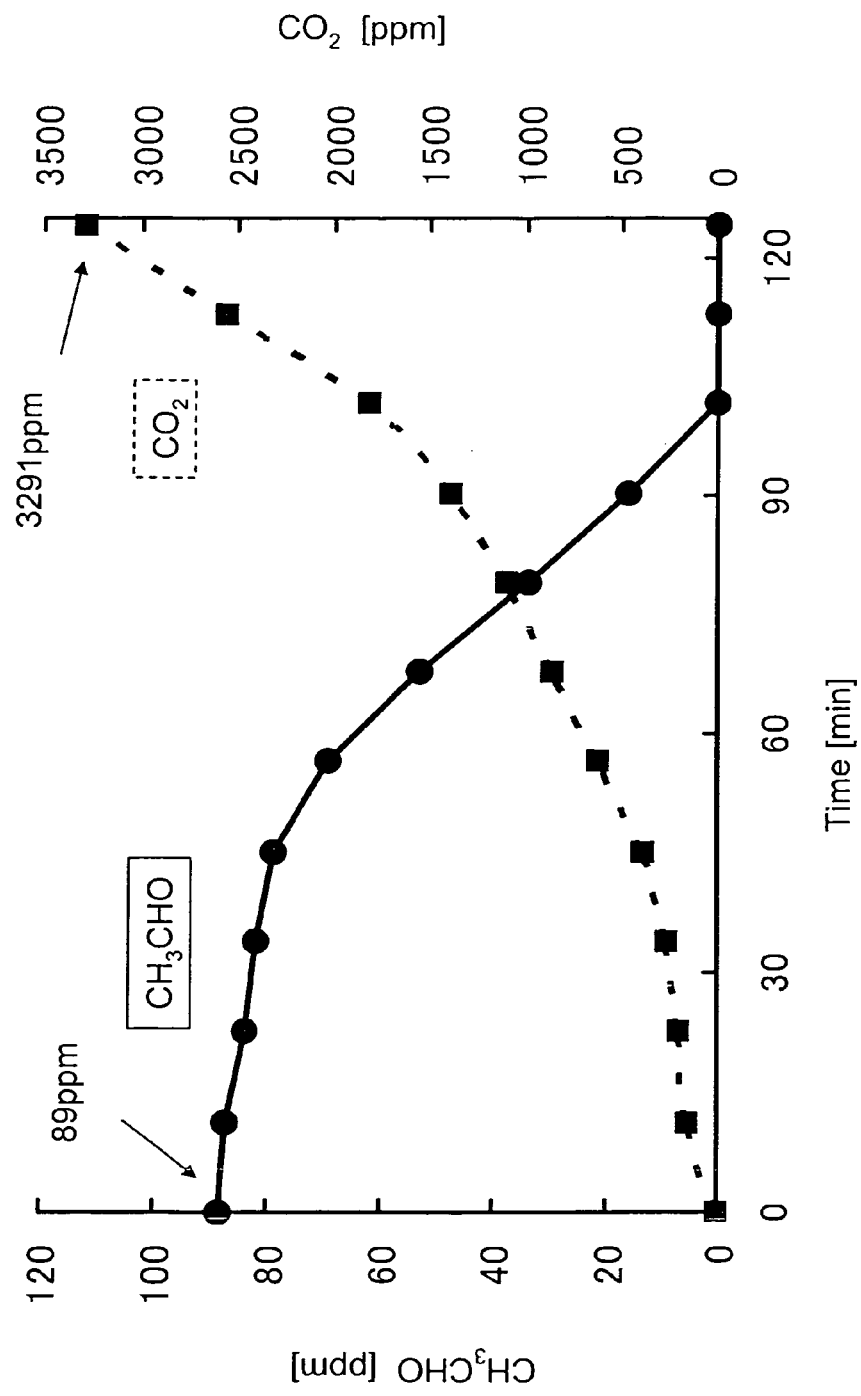

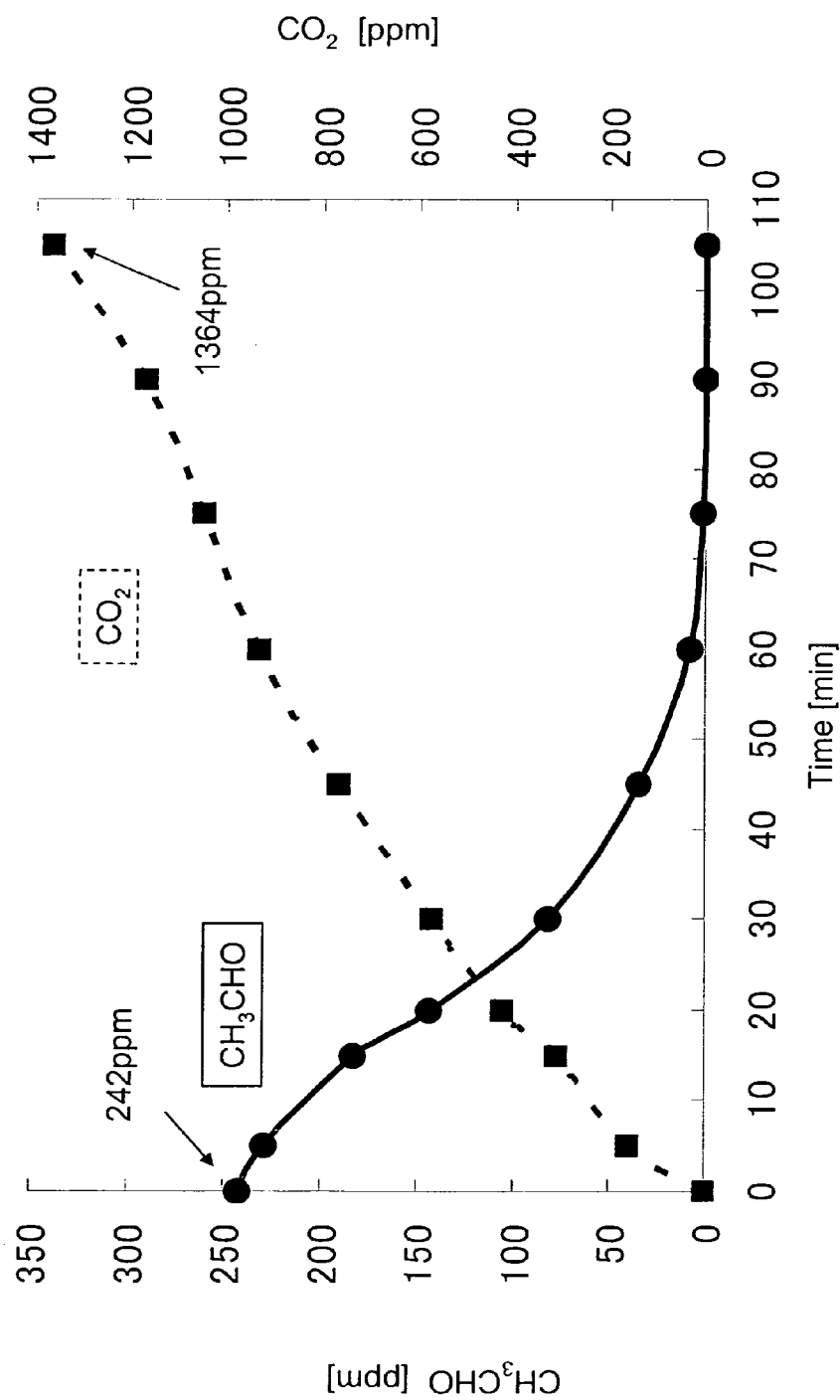
Fig. 5C  MLS-2 alumina fine fiber to which titania coating is applied 1g

[ JIS method ]

[JIS modified method by inventors of the present invention]

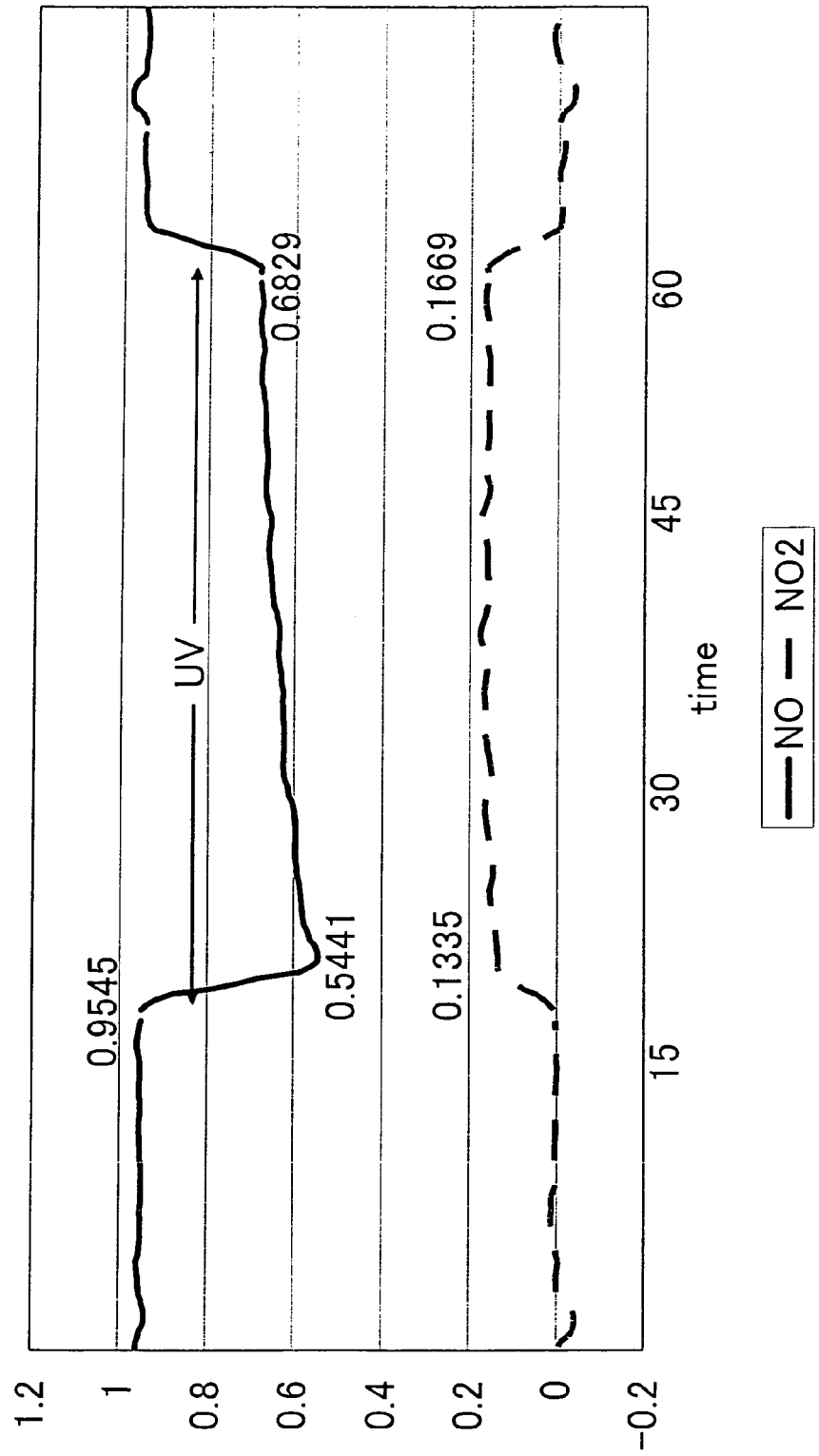

METHOD FOR MANUFACTURING TITANIA COATED ALUMINA FIBER AGGREGATE

REFERENCE TO RELATED APPLICATION

This is a continuation-in-part application of Ser. No. 11/988,077, filed Jul. 21, 2009, which is currently pending. The subject matter of the aforementioned prior application is hereby incorporated herein by reference.

BACKGROUND OF THE INVENTION

1. Field of the Invention

The present invention relates to a method for manufacturing a titania coated alumina fiber aggregate.

2. Description of the Related Art

Conventionally, it has been known that when pure aluminum or aluminum-based metal such as aluminum alloy is exposed to air under normal temperature, a surface of aluminum-based metal reacts with oxygen in air thus forming a natural oxide film on a surface thereof.

This natural oxide film is made of alumina (aluminum oxide) and exhibits advantageous effects such as heat resistance and corrosion resistance. However, only with the natural oxide film, it is difficult for aluminum-based metal to exhibit sufficient heat resistance and sufficient corrosion resistance not only under a high temperature condition but also under a normal environment. Further, to apply coating forming such as painting to aluminum-based metal, the formation of an oxide film having a larger thickness becomes necessary.

Accordingly, attempts have been made to achieve the enhancement of durability and heat resistance and the enhancement of working performance by imparting the two-layered structure to aluminum-based metal in which an artificial oxide film is formed by further oxidizing a lower layer of the natural oxide film.

As a method for forming the artificial oxide film which constitutes the second layer, a method which uses strong-acid solution and an oxidizing method which uses an anodization technique have been mainly known.

On the other hand, a fiber formed by aluminum-based metal (hereinafter simply referred to as aluminum fiber) exhibits an excellent strength and excellent formability compared to other metal fibers and, at the same time, the aluminum fiber possesses an extremely large film surface area and hence, the aluminum fiber is used as an industrial material or a carrier of a catalyst in broad fields.

Further, if a fiber which is formed by oxidizing a surface of the aluminum fiber with a large film thickness (hereinafter, referred to as alumina fiber) can be formed, dip coating formability is enhanced and hence, it is possible to produce a functional catalytic fiber which carries platinum or the like thereon or it is possible to apply photocatalytic titania coating which exhibits excellent durability to a surface of the alumina fiber. Accordingly, there has been a demand for the alumina fiber having the larger oxide film thickness.

However, in the treatment of the surface of the aluminum fiber by the method which oxidizes the surface of the aluminum fiber using a strong-acid solution, aluminum is resolved in the strong-acid solution and hence, it is difficult to manufacture the alumina fiber having the oxide film with a large film thickness.

Accordingly, there has been proposed a method which oxidizes an aluminum fiber by heating the aluminum fiber at a temperature of 100 to 400° C. in air without using a strong-acid solution (see JP-A-11-279843 (patent document 1), for example).

SUMMARY OF THE INVENTION

However, although the above-mentioned oxidizing method which heats the aluminum fiber at a temperature of 100 to 400° C. is effective for oxidizing the aluminum fiber in a non-oxidized state which does not form a natural oxide film, it is difficult to form an oxide film having a large film thickness on the aluminum fiber on which a natural oxide film is already formed.

The reason that such a phenomenon occurs is attributed to a fact that once the natural oxide film is formed, such a natural oxide film interrupts the infiltration of oxygen into a deep portion of the metal fiber and hence, even when the metal fiber is heated at a temperature of 100 to 400° C., the formation of the oxide film advances but slowly.

Further, with respect to the alumina fiber which is prepared by the above-mentioned oxidizing method which heats the alumina fiber at a temperature of 100 to 400° C., when photocatalytic titania coating is applied to a surface of the alumina fiber, it is difficult to sufficiently form a titania thin film and a coated film is peeled off. Accordingly, the alumina fiber lacks property to function as a carrier for forming a photocatalytic titania thin film and, at the same time, the alumina fiber does not posses heat resistance to withstand a heating temperature (approximately 750° C. sufficient for the formation of a film of rutile-type photocatalytic titania fiber.

This implies that a thickness of the oxide film formed on the aluminum fiber is insufficient so that a strength of bonding between aluminum and the oxide film is insufficient. Since the oxide film having the thickness sufficient as the carrier of photocatalytic titania coating is not formed on the aluminum fiber and hence, the possibility of utilization of the aluminum fiber as the catalytic carrier has been questioned technically.

In view of the above, inventors of the present invention have extensively studied and developed a method for manufacturing a titania coated alumina fiber body where a titania thin film is formed on surfaces of an alumina fibers. Due to such a manufacturing method, a titania coated alumina fiber aggregate having alumina fibers with a thick oxide film of high quality thereon can be manufactured. Further, the manufacturing method can manufacture a titania coated alumina fiber aggregate having a uniform and hardly peelable titania thin film which is suitable for a filter or a catalyst body. The present invention has been made based on such studies and development.

To overcome the above-mentioned drawbacks, according to one aspect of the present invention, there is provided a method for manufacturing a titania coated alumina fiber aggregate which includes the steps of: forming an aluminum fiber aggregate where a plurality of aluminum fibers made of aluminum and having a fiber length of 5 mm to 20 cm are stored and are pressed in a predetermined mold frame in a state where the aluminum fibers are entangled thus forming an aluminum fiber aggregate having a desired shape where the aluminum fibers are aggregated with density per unit volume of 0.5 $g/cm^3$ to 3 $g/cm^3$; forming an alumina fiber aggregate where the aluminum fiber aggregate is heated up to a temperature approximately half of a melting point of the aluminum while maintaining a temperature gradient of approximately 5° C. or less per minute and, thereafter, the alumina fiber aggregate is maintained at a temperature of approximately half of the melting point for 30 minutes to 3 hours so as to form an oxide film having a film thickness of 5 nm or more on the aluminum fibers and, thereafter, the aluminum fiber aggregate is heated up to a temperature close to a melting point thereof and, thereafter, the aluminum fiber aggregate is maintained around the temperature close to the melting point for 30 minutes to 12 hours thus forming the alumina fiber aggregate with the oxide film having a film thickness of 50 nm or more; and forming a titania coated alumina fiber aggregate where the alumina fiber aggregate is immersed in a sol liquid containing a titania compound, and is pulled up from the sol liquid, and the sol liquid adhered to surfaces of the alumina fibers which constitute the alumina fiber aggregate is dried and, thereafter, the alumina fibers are baked thus forming a titania thin film on the alumina fibers whereby the titania coated alumina fiber aggregate is manufactured.

The method for manufacturing a titania coated alumina fiber aggregate according to the present invention is also characterized by the following constitutions.

(1) Before drying the sol liquid, a gas is sprayed to the alumina fiber aggregate which is pulled up from the sol liquid thus allowing the gas to be sprayed to contact points between the alumina fibers constituting the alumina fiber aggregate.

(2) Ultrasonic vibrations are applied to the alumina fiber aggregate for a predetermined time during a period within which the alumina fiber aggregate is immersed in the sol liquid and, thereafter, the alumina fiber aggregate is held in a stationary state while being immersed.

(3) The ultrasonic vibrations are applied for 30 seconds to 30 minutes.

(4) The alumina fiber aggregate is held in a stationary state for 1 minute to 24 hours.

(5) The sol liquid contains 15 to 25 weight % of titanium diisopropoxybis(acetylacetonate), 5 to 10 weight % of isopropyl alcohol, 55 to 75 weight % of ethanol and 5 to 10 weight % of water.

(6) The immersion of the alumina fiber aggregate in the sol liquid is performed in a hermetically-sealed vessel having a volume larger than a volume of the stored sol liquid using the sol liquid at a temperature of 35° C. to 60° C., and the alumina fiber aggregate is immersed while allowing alcohol contained in the sol liquid to volatilize thus increasing a pressure of a gas phase in the hermetically-sealed vessel.

(7) A mixing ratio of titanium diisopropoxybis(acetylacetonate), ethanol and water in the sol liquid is set to 3.5:9:1.

(8) The baking of the alumina fiber aggregate is performed by heating the alumina fiber aggregate up to 450° C. while maintaining a temperature elevation gradient of 2 to 15° C./min, and the alumina fiber aggregate is held at 450° C. for a predetermined time.

BRIEF EXPLANATION OF DRAWINGS

FIGS. 4A, 4B, 4C are explanatory views showing a result of an acetaldehyde decomposition comparative test of the titania coated alumina fiber aggregate and a non-woven fabric to which photocatalytic function is imparted.

FIGS. 5A, 5B, 5C are explanatory views showing a result of the acetaldehyde decomposition comparative test of the titania coated alumina fiber aggregate.

FIGS. 7A, 7B are explanatory views showing a result of the NOx decomposition test of the titania coated alumina fiber aggregate.

DETAILED DESCRIPTION OF THE INVENTION

Figure 1A:
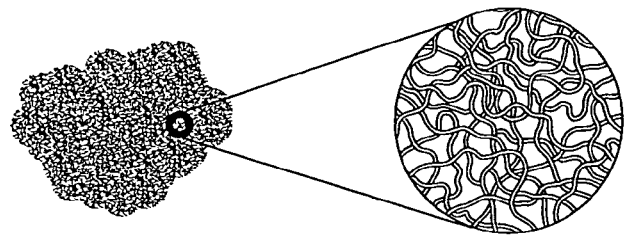
FIGS. 1A, 1B, 1C are explanatory views showing mode examples of an aluminum fiber aggregate, an alumina fiber aggregate and a titania coated alumina fiber aggregate.

In a method for manufacturing a titania coated alumina fiber aggregate according to the present invention, firstly, an alumina fiber aggregate is formed, and a titania thin film is formed on a surface of the alumina fiber aggregate (to be more specific, surfaces of alumina fibers of the alumina fiber aggregate) thus forming at titania coated alumina fiber aggregate. In forming an alumina coating film according to the present invention, an aluminum fiber which has a surface thereof covered with a natural oxide film is prepared, and aluminum which forms a lower layer of the natural oxide film is oxidized by heating up to a temperature approximately half of a melting point of the aluminum fiber thus forming an artificial oxide film below the natural oxide film as a corrosion protective film.

The aluminum fiber is made of pure aluminum or aluminum alloy (hereinafter, referred to as aluminum-based metal). Aluminum alloy is alloy prepared by adding an element such as silicon, iron, copper, manganese, magnesium, zinc, chromium to aluminum, and is metal generally known as 1000 system, 2000 system, 3000 system, 4000 system, 5000 system, 5000 system or 7000 system.

Here, temperature which is approximately half of the melting point means a temperature which falls within a range of ±10% from 0° C. to approximately half of the melting point (Celsius) of aluminum-based metal which forms the aluminum fiber.

In other words, the temperature approximately half of the melting point means a temperature which falls within a range between an upper-limit temperature and a lower-limit temperature obtained by following formulae.

upper-limit temperature[° C.]=(melting point of aluminum-based metal[° C.]÷2)×1.1 lower-limit temperature[° C.]=(melting point of aluminum-based metal[° C.]÷2)×0.9

Then, aluminum which forms the lower layer of the artificial oxide film is oxidized by heating up to a temperature close to the melting point from the temperature approximately half of the melting point of aluminum-based metal which forms the aluminum fiber thus forming a deep-layer oxide film on the lower layer of the artificial oxide film. By further oxidizing aluminum which forms the lower layer of the deep-layer oxide film by heating up to a temperature which exceeds the melting point, a deepest-layer oxide film having a large film thickness is formed on a lower layer of the deep-layer oxide film.

That is, in forming an alumina coating film in a method for manufacturing a titania coated alumina fiber aggregate according to the present invention, by applying the heat treatment of three stages to the aluminum fiber, it is possible to make oxygen infiltrate into a deep portion of the aluminum fiber while maintaining a fiber shape and, at the same time, by forming the oxide film having the four-layered structure, it is possible to prepare the alumina fiber which exhibits favorable heat resistance and favorable dip coating property.

Further, the alumina fiber which is prepared by forming an alumina coating film in the method for manufacturing a titania coated alumina fiber aggregate according to the present invention maintains, while having the alumina layer on the surface thereof, the layer formed below the alumina layer in an aluminum-based metal state and hence, the alumina fiber exhibits high flexibility so that the alumina fiber can be easily deformed into a desired shape. The flexibility which this fiber possesses also exhibits the excellent moldability when an alumina fiber aggregate described next is deformed into a desired shape.

Further, the present invention can uniformly form the alumina coating film on the surface of the aluminum fiber not only in a single fiber state but also in a fiber aggregate state using a simple and low-cost manufacturing method. Still further, the present invention provides the method for forming an alumina coating film which can enhance heat resistance and mechanical properties of the aluminum fiber compared to the aluminum fiber before forming the alumina coating film and the alumina fiber formed by the method. In this embodiment, the alumina fiber means a fiber which forms the artificial oxide film on the lower layer of the natural oxide film which the aluminum fiber includes and the deep-layer oxide film is formed on the lower layer of the artificial oxide film.

The aluminum fiber is, for example, prepared by melting aluminum-based metal and by molding molten aluminum-based metal into a fiber shape by a melt spinning method described later. Here, it is desirable to set a diameter of the aluminum fiber to 50 to 200 μm, and it is more preferable to set the diameter of the aluminum fiber to 80 to 150 μm. When the fiber diameter becomes below 50 μm, there exists a possibility that strength of the alumina fiber on which the oxide film is formed becomes insufficient, while when the fiber diameter exceeds 200 μm, heating irregularities are liable to occur at the time of forming the oxide film. Further, a length of the aluminum fiber is suitably adjustable depending on a usage and is not particularly limited.

Figure 1B:
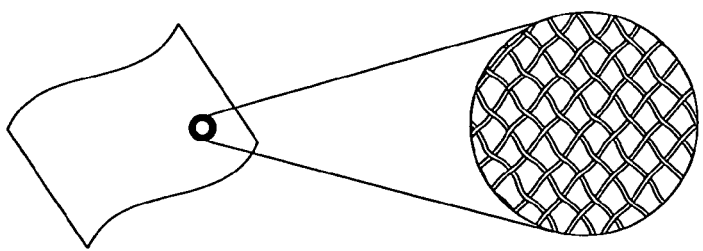
Figure 1C:
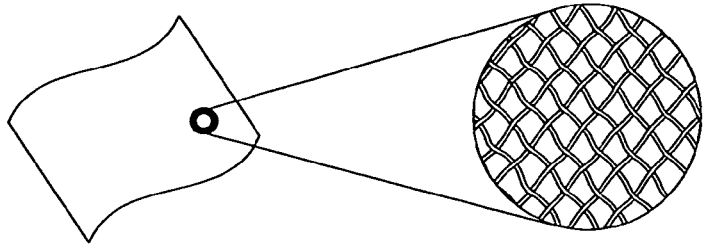

Here, the aluminum fiber aggregate may be formed by aggregating aluminum fibers in various forms. For example, as shown in FIG. 1A, it is possible to form an aggregate of respective fibers preferably used as a filter or the like by forming aluminum fibers into a sheet shape by weaving. Further, as shown in FIG. 1B, the aluminum fibers may be formed into an aggregate of respective fibers preferably used as a filter or the like by forming the respective fibers into a non-woven fabric state. Further, as shown in FIG. 1C, an aggregate may be formed by collecting the respective fibers in a single steel wool shape. By forming the aggregate in this manner, a cost necessary for forming such an aggregate can be suppressed to a low cost. Further, the aggregate formed in a steel wool shape can freely change a shape thereof and hence, the aggregate may be molded into a suitable shape such as a spherical shape, a plate shape, a columnar shape, or a cylindrical shape depending on a usage. By forming the aluminum fiber aggregate by entangling aluminum fibers, it is possible to form the aluminum fiber aggregate into a porous body having a large surface area while having a relatively small volume.

Even when the aluminum fibers are formed into the aggregate, heat applied in the respective oxide film forming steps can extend to every corner of the aluminum fiber aggregate and hence, it is possible to bake a uniform oxide film by uniform heating. Further, by performing unique heating in each oxide film forming step, the respective aluminum fibers which form the aluminum fiber aggregate are thermally expanded and move little by little so that contact points between the fibers repeat the contact and the separation whereby it is possible to perform heating and baking of the oxide film having no irregularities.

The aluminum fibers or the aluminum fiber aggregate formed in this manner are subject to an artificial oxide film forming step, a deep-layer oxide film forming step and a deepest-layer oxide film forming step when necessary which are described later so as to form alumina fibers or the alumina fiber aggregate.

For example, in preparing the plate-shaped alumina fiber aggregate, the steel-wool-shaped aluminum fiber aggregate is stored in a mold, is pressed so that the aluminum fiber aggregate is formed into a plate shape. Then, by heating the aluminum fiber aggregate, the alumina fiber aggregate is formed. Here, by setting an aluminum fiber quantity per 1 $cm^3$ to 0.5 g to 3 g, it is possible to prepare the aluminum fiber aggregate having pores and aluminum fiber density suitable for a filter or a catalyst carrier.

Further, according to the above-mentioned method, the aluminum fiber aggregate is formed by preliminarily collecting the aluminum fibers, and the alumina fiber aggregate is formed by heating this aluminum fiber aggregate. However, the alumina fibers may be formed by directly heating the aluminum fibers and the aluminum fiber aggregate may be formed by collecting these alumina fibers.

The alumina fiber aggregate can also freely change a shape thereof and hence, the alumina fiber aggregate may be also molded into a spherical shape, a plate shape, a columnar shape, a cylindrical shape or the like suitably depending on a usage.

Also in this case, it is preferable to set the density per unit volume of the alumina fibers to 0.5 $g/cm^3$ to 3 $g/cm^3$.

Further, titania fibers which is prepared by coating titania on the alumina fiber which constitutes a carrier or a titania coated alumina fiber aggregate which is prepared by coating titania to the alumina fiber aggregate which constitutes a carrier possesses excellent durability, excellent hydrophilicity and excellent water retentiveness derived from the carrier and also possesses the efficient photocatalytic performance. Accordingly, the present invention provides the titania fibers which are applicable to broad fields such as the deodorization of odors, the purification of an exhaust gas discharged from an engine or the like, sterilization and purification of water, and the decomposition of organic substances. Further, the present invention also provides the titania fibers which can exhibit the photocatalytic performance not only in the normal-temperature air but also underwater or under a high temperature condition.

Further, the present invention also provides a gas treatment system having a gas treatment filter which includes the alumina fibers and/or the titania fibers.

According to this gas treatment system, due to the decomposition by oxidation of harmful substance due to the excellent photocatalytic performance of the titania fiber, it is possible to surely and effectively treat the gas.

Here, when the gas treatment system includes the titania coated alumina fiber aggregate which is formed by applying titania coating to a surface of the alumina fiber aggregate as the photocatalyst body, it is preferably to set a fiber length to 5 mm to 20 cm. By using the titania coated alumina fiber aggregate having the titania fibers of such a fiber length as the photocatalyst body, it is possible to form a photocatalyst body having a large number of fiber distal ends. Accordingly, when the photocatalyst body is immersed in water and ultraviolet rays and ultrasonic waves are radiated, it is possible to efficiently diffuse active oxygen species in water. Here, when the fiber length is set to a value less than 5 mm, the fibers are hardly entangled with each other and hence, the shape retention of the photocatalyst body is worsened. On the other hand, when the fiber length becomes 20 cm or more, the number of fiber distal ends which the photocatalyst body possess per unit weight is decreased and hence, there exists a possibility that a diffusion efficiency of active oxygen species is worsened. However, when it is difficult to perform a measurement such as a specific surface area measurement in a state that the fibers entangle each other, it may be possible to restrict the fiber length to 5 mm so as to prevent the fibers from entangling each other.

The formation of the alumina fibers in a method for manufacturing a titania coated alumina fiber aggregate according to this embodiment is explained in detail in the following order.

(1) Aluminum fibers preparation step
(2) Artificial oxide film forming step
(3) Deep-layer oxide film forming step
(4) Deepest-layer oxide film forming step (1) Aluminum Fibers Preparation Step The aluminum fibers which become the raw material of the alumina fibers are not particularly limited. However, the aluminum fibers can be prepared by a following method, for example.

Figure 2:
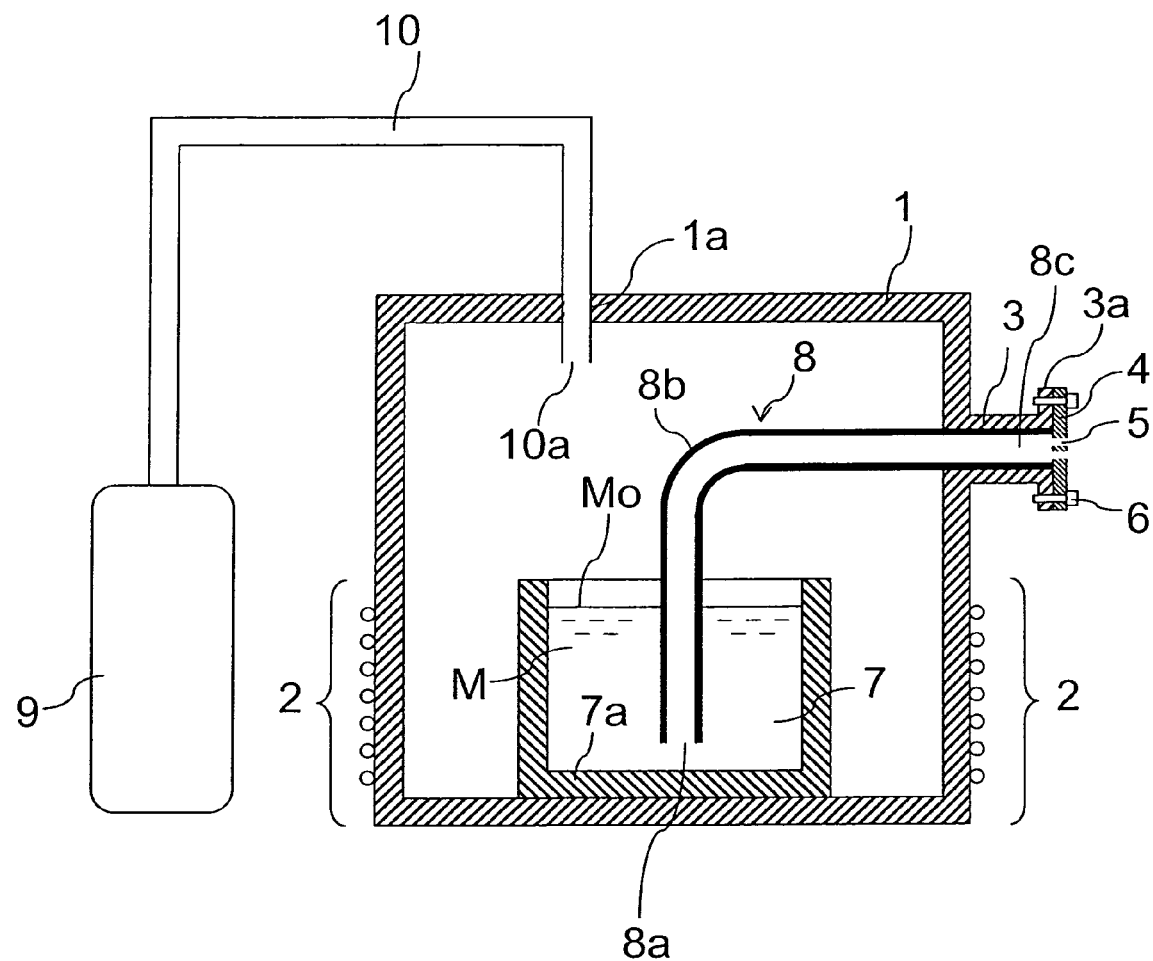
FIG. 2 is a schematic view showing a preparation device of an aluminum fiber.
Figure 3:
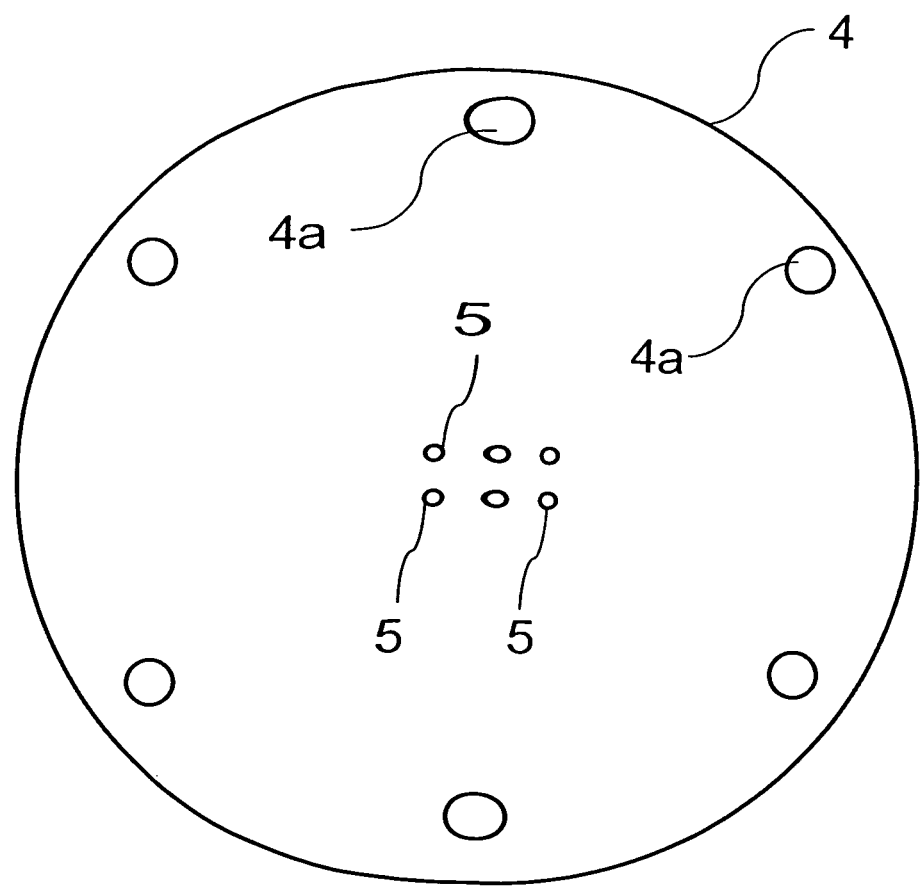
FIG. 3 is a schematic view showing a preparation device of an aluminum fiber.

FIG. 2 and FIG. 3 show a system which prepares the aluminum fibers.

In a hermetically-sealed vessel 1, a melting crucible 7 which contains molten metal M made of aluminum-based metal is arranged. By supplying a compressed gas into the inside of the hermetically-sealed vessel 1, the molten metal M is ejected from ejection holes 5, 5, . . . . The ejected molten metal M is solidified by quenching so that the aluminum fibers are formed. Hereinafter, this aluminum fiber forming method is referred to as melt spinning method.

In FIG. 2 and FIG. 3, symbol 1 indicates the hermetically-sealed vessel, symbol 2 indicates a heating device, symbol 3 indicates a short pipe portion, symbol 3a indicates a flange, symbol 4 indicates a nozzle, symbols 5, 5, . . . indicate ejection holes, symbols 6, 6, . . . indicate bolts, symbol 7 indicates the melting crucible, symbol 7a indicates a bottom portion, symbol 8 indicates a molten metal supply pipe, symbol 8a indicates a lower-end opening portion, symbol 8b indicates a bent pipe portion, symbol 8c indicates an upper end opening portion, symbol 9 indicates a pressurizing mechanism, symbol 10 indicates a pressurized gas supply pipe, symbol 10a indicates an end portion, symbol M indicates the molten metal, and symbol Mo indicates a molten metal surface.

With the use of such a melt spinning method, it is possible to easily acquire a large quantity of aluminum fibers. Here, the acquired aluminum fibers may be collected in a steel wool shape to form the aluminum fiber aggregate. Using such an aluminum fiber aggregate in the formation of the oxide film explained later, it is possible to acquire the alumina fiber aggregate.

Further, to fiber surfaces of the aluminum fibers or the aluminum fiber aggregate, alumina fine fibers may be adhered.

As such alumina fine fibers, crystallized alumina fibers having a diameter of approximately 3 to 10 μm which is smaller than a fiber diameter of the aluminum fibers which constitute the aluminum fiber aggregate can be used. For example, it is possible to use Maftec (registered trade mark), ALS, MLS-2 made by Mitsubishi Chemical Functional Products, Inc or the like.

(2) Artificial Oxide Film Forming Step,

Next, a method for forming an artificial oxide film on surfaces of the aluminum fibers is explained.

The artificial oxide film which is formed below a natural oxide film of the aluminum fibers is formed by heating the aluminum fibers up to a temperature approximately half of a melting point of the aluminum fibers (allowable within a range of ±10%).

In the heating treatment for forming the artificial oxide film, by heating the aluminum fibers in an oxidizing atmosphere such as an atmospheric atmosphere while maintaining a temperature gradient of approximately 5° C. or less per minute, it is possible to form the dense artificial oxide film.

The formed artificial oxide film plays a role of preventing the aluminum fibers from being collapsed by melting at the time of forming the deep-layer oxide film by heating described later.

Here, the artificial oxide film may be formed such that the aluminum fibers are heated up to a temperature approximately half of the melting point of the aluminum fibers while maintaining a temperature gradient of approximately 5° C. or less per minute and, thereafter, the temperature approximately half of the melting point is maintained for a predetermined time.

By holding a temperature approximately half of the melting point for the predetermined time, a thickness of the artificial oxide film can be increased. Accordingly, it is possible to further effectively prevent the aluminum fibers from being collapsed by melting at the time of forming the deep-layer oxide film. Further, by holding such a temperature, it is also possible to acquire an advantageous effect that the alumina fibers having a stable film thickness can be formed.

The holding time can be suitably changed corresponding to a desired film thickness. By preferably holding the temperature for approximately 30 minutes to 3 hours, it is possible to acquire an advantageous effect that the film thickness of the deep-layer oxide film can be made stable.

When the holding time is less than 30 minutes, no temperature holding effect is obtained by holding the temperature, while when the holding time exceeds 3 hours, no apparent increase of the film thickness is desired and the production efficiency is lowered.

Further, with respect to the artificial oxide film formed by the above-mentioned method, it is preferable to perform the treatment such that a total thickness of the natural oxide film and the artificial oxide film becomes 5 nm or more. In this case, it is possible to form the deep-layer oxide film while preventing the collapse of the aluminum fibers.

(3) Deep-Layer Oxide Film Forming Step

Next, the deep-layer oxide film is formed below the artificial oxide film. With the formation of the deep-layer oxide film, it is possible to form the aluminum fibers into the alumina fibers.

The alumina fibers are formed by heating the aluminum fibers in an oxidizing atmosphere such as an atmospheric atmosphere up to a temperature close to the melting point of the aluminum-based metal which forms the aluminum fibers from the temperature approximately half of the melting point of the aluminum-based metal.

The heating temperature during the heating treatment for forming the deep-layer oxide film may be a temperature as high as possible provided that the temperature is below the melting point of the aluminum-based metal which forms the aluminum fibers. The heating temperature may preferably be a temperature which is lower than the melting point (° C.) by approximately 10%. This is because that the higher the heating temperature, more efficiently aluminum can be oxidized and, at the same time, it is possible to prevent the aluminum fibers from being erroneously heated at a temperature which exceeds the melting point.

The alumina fibers which form the deep-layer oxide film constitute fibers which are surrounded by an alumina shell having a large film thickness.

The melting point of the alumina shell is higher than a melting point (660° C.) of pure aluminum and a melting point of general aluminum-based metal, and is approximately 1400 to 2050° C.

Accordingly, when the alumina fibers is heated at a temperature which exceeds the melting point of aluminum-based metal, aluminum-based metal which is present from a lower layer to a center portion of this shell is melted. However, so long as alumina shell is not melted, the alumina fibers can maintain a fiber shape.

That is, the natural oxide film, the artificial oxide film and the deep-layer oxide film play a role of the shells which prevent the aluminum-based metal below the deep-layer oxide film from being melted and flown out at the time of heating the alumina fibers at a temperature equal to or more than the melting point of the aluminum-based metal in the heating forming treatment step of the deepest-layer oxide film described later.

Accordingly, even when the aluminum-based metal in the inside of the fibers is melted by the heating forming treatment step of the deepest-layer oxide film at a temperature which exceeds the melting point of aluminum, the natural oxide film, the artificial oxide film and the deep-layer oxide film formed on a surface of the alumina fibers are not melted and hence, the alumina fibers can maintain the fiber shape.

Here, to form the artificial oxide film and the deep-layer oxide film which can withstand the heating forming treatment of the deepest-layer oxide film, it is preferable to set a total thickness of the natural oxide film, the artificial oxide film and the deep-layer oxide film to 50 nm or more in the heating forming treatment step of the deep-layer oxide film. When the aluminum fibers having a diameter of 100 m is used, a thickness of 50 nm of the alumina coating film corresponds to 1/2000 of the diameter of the aluminum fibers. When the film thickness of the alumina coating film becomes a value less than 50 nm, the alumina fibers cannot hold the fiber shape in the heating forming treatment step of the deepest-layer oxide film and hence, there exists a possibility that aluminum which is present in the inside of the alumina fibers is melted and flows out to form a block.

Further, since the artificial oxide film and the deep-layer oxide film are formed of aluminum oxide having high corrosion resistance, the artificial oxide film and the deep-layer oxide film also constitute a corrosion protective film which protects the aluminum-based metal present in the inside of the alumina fibers from corrosion.

Along with such findings, due to extensive studies made by inventors of the present invention, it is also found that by setting the film thickness of the oxide film to 50 nm or more, the alumina fibers can obtain a surface suitable for favorable dip coating.

The alumina fibers, as a whole, possesses heat resistance against the temperature higher than the melting point of the aluminum-based metal. Here, the heat resistance implies, as mentioned previously property which allows the alumina fibers to maintain the fiber shape even under the condition that heating temperature is higher than the melting point of the aluminum-based metal which forms the aluminum fibers. That is, the heat resistance does not imply the resistance against the momentary exposure temperature but the resistance against the environmental maintenance temperature.

Further, in the deep-layer oxide film step, by holding the alumina fibers at a temperature close to the melting point for a predetermined time, it is possible to form the deep-layer oxide film having the more stable thickness. Here, although the temperature holding time is not particularly limited, the temperature holding time may be set to approximately 30 minutes to approximately 12 hours. When the temperature holding time is less than 30 minutes, it is impossible to acquire an advantageous effect to make the film thickness of the deep-layer oxide film stable. On the other hand, when the heating temperature is held for a time exceeding 12 hours, no apparent film thickness stabilizing effect can be obtained.

Further, by performing the heating in two stages consisting of the heating which is performed at the temperature approximately half of the melting point of the aluminum-based metal and the heating which is performed at the temperature raising from the temperature approximately half of the melting point of the aluminum-based metal to the melting point of the aluminum-based metal for a predetermined time, it may be possible to form the artificial oxide film and the deep-layer oxide film having the stable film thickness below the natural oxide film.

The alumina fibers according to the present invention which includes the natural oxide film, the artificial oxide film and the deep-layer oxide film formed in this manner have surfaces suitable for favorable dip coating.

Here, it is found that by performing the heating treatment at the temperature equal to or less than the melting point for a long time, the oxidation reaction gently advances along with a lapse of time, and at a point of time that the film thickness of the alumina coating film exceeds approximately 50 nm, the alumina fibers start exhibiting of a function of alumina. This implies that even when the deepest-layer oxide film described later is not formed, the alumina fibers have a sufficient use value as a carrier of a photocatalyst. Accordingly, depending on a desired usage or use condition, the alumina fibers or the titania fibers may adopt the three-layered structure or the four-layered structure.

(4) Deepest-Layer Oxide Film Forming Step

Next, a method for forming the deepest-layer oxide film on the alumina fibers is explained.

The alumina fiber having the above-mentioned deep-layer oxide film has already possessed the surface suitable for favorable dip coating and hence, depending on the desired film thickness of the oxide film, this step is not always necessary. However, when it is desirable to impart further heat resistance to the alumina fiber or when it is necessary to further increase the thickness of the oxide film, this step is effective.

The deepest-layer oxide film formed by this step is a layer which is formed further below the deep-layer oxide film by heating the alumina fiber at a temperature higher than the melting point of the aluminum-based metal forming the aluminum fiber.

The heating treatment performed in this step may perform heating at a temperature which exceeds the melting point of the aluminum-based metal for forming the aluminum fiber, can maintain a fiber shape, and can maintain the crystal structure of alumina.

Accordingly, it is preferable to suitably adjust the heating forming temperature of the deepest-layer oxide film corresponding to the melting point of aluminum-based metal for forming the aluminum fiber.

For example, when aluminum-based metal for forming the aluminum fiber is aluminum of 1000 order having a melting point of approximately 660° C., the heating forming temperature of the deepest-layer oxide film can be set to a value which falls within a range from 660° C. to 800° C.

By forming the alumina coating film in this manner, the alumina fiber can have the four-layered structure consisting of the natural oxide film, the artificial oxide film, the deep-layer oxide film and the alumina coating film which constitutes the deepest-layer oxide film and a film thickness of the four-layered oxide film is set to 50 nm or more and hence, it is possible to impart the excellent heat resistance to the alumina fiber.

Further, by performing the heating forming treatment of the artificial oxide film, the deep-layer oxide film and the deepest-layer oxide film particularly in air, it is possible to manufacture the high-quality alumina fiber at a low cost.

Here, in the heating forming treatment of the artificial oxide film, the deep-layer oxide film and the deepest-layer oxide film, these films may be formed by continuously elevating the heating temperature. However, in performing such a heating forming treatment, the artificial oxide film and the deep-layer oxide film are continuously formed by continuously elevating the heating temperature of the aluminum fiber up to 600° C. gradually at a gradient of 5° C. per minute and, thereafter, the deepest-layer oxide film may be formed by heating the aluminum fiber at a temperature which exceeds the melting point of the aluminum fiber.

Although the alumina fiber according to the present invention may be formed using the aluminum fiber in the above-mentioned manner, it is needless to say that the alumina fiber aggregate may be formed by treating the aluminum fiber aggregate in the same manner. Further, the alumina fiber aggregate may be formed by forming the alumina fibers and, thereafter, by collecting the alumina fibers.

Next, properties of the aluminum fiber and the alumina fiber which are obtained in the above-mentioned respective steps consisting of (1) aluminum fiber preparing step, (2) artificial oxide film forming step, (3) deep-layer oxide film forming step, and (4) deepest-layer oxide film forming step are explained.

(5) Film Thicknesses of Aluminum Fiber and Alumina Fiber

First of all, film thicknesses of the oxide films which the aluminum fiber or the alumina fiber acquired by the above-mentioned respective steps (1) to (4) includes are measured.

Measured samples are obtained by making the aluminum fibers having a diameter of 100 μm which are prepared by a melt spinning method using aluminum-based metal of 1000 order subject to the above-mentioned respective steps (1) to (4).

Further, the film thicknesses are measured based on the AES depth profile measurement. With the use of this measuring method, by digging a fine hole into a deep portion from a surface of the aluminum fiber or the alumina fiber, it is possible to measure a thickness of the oxide film. Here, in performing the AES depth profile measurement, an Auger electron spectroscope meter (Auger microwave JAMP-10MXII made by JEOL Ltd.) is used. The film thickness of an alumina layer is calculated based on an intersecting point of relative mass curves of an aluminum and oxygen obtained by the measurement. Although it is considered that the alumina layer has a thickness more than the acquired numerical value in the actual aluminum fiber or the alumina fiber, the intersecting point is defined as the film thickness of the alumina layer by taking an error range of the numerical value into consideration.

TABLE 1

| | heating history | step | film thickness measurement result (nm) |
|---|---|---|---|
| A-1 | before heating | after aluminum fiber preparing step | 1.1 |
| A-2 | heating up to 350° C. with temperature gradient of 5° C./min | after heating forming step of artificial oxide film | 5.0 |
| A-3 | heating up to 350° C. with temperature gradient of 5° C./min, subsequently heating up to 600° C., and holding heating temperature of 600° C. for 3 hours | after heating forming step of deep-layer oxide film | 13.3 |
| A-4 | heating up to 350° C. with temperature gradient of 5° C./min, subsequently heating up to 600° C., and further heating up to 750° C. | after heating forming step of deepest-layer oxide film | 50 nm or more (measurement limit) |

As shown in A-1 in Table 1, it is found that a natural oxide film having a thickness of approximately 1 nm is formed on a surface of the aluminum fiber acquired by the aluminum fiber preparing step.

Further, A-2 shows a result of the formation of an artificial oxide film which is formed by heating the aluminum fiber at a temperature up to 350° C. in air and, while maintaining a temperature gradient of approximately 5° C. or less per minute and holding the temperature for 10 hours. A-2 shows that a total thickness of the natural oxide film and the artificial oxide film which are present in the aluminum fiber is approximately 5 nm.

To particularly focus on the result of A-2, even when the heating treatment is performed for a long time (10 hours in total in this embodiment) at a temperature equal to or below the melting point, only with heating and baking of one stage, the oxidizing reaction progresses but gently.

A-3 shows a film thickness of the alumina fiber which is subject to heat treatment in the deep-layer oxide film forming step. As a result, it is found that an oxide film having a further larger thickness of 13 nm is acquired compared to A-2.

A-4 shows a result of measurement of a film thickness of the deepest-layer oxide film when the deepest-layer oxide film is obtained by heating the alumina fiber obtained by the deep-layer oxide film forming step up to 750° C. By making the alumina fiber subject to the deepest-layer oxide film forming step, it is found that an oxide film of 50 nm or more which is a measurement limit of this experiment system is formed on the alumina fiber.

Due to the results of these A-1 to A-4, it is found that the formation of the alumina coating film in the method for manufacturing a titania coated alumina fiber aggregate according to the present invention can form the oxide film having a large film thickness which is 10 to 50 times or more as large as a film thickness of a natural oxide film.

Next, the influence which is imparted to the film thickness when the heating is held for a predetermined time at a temperature close to the melting point of aluminum-based metal which constitutes the aluminum fiber in the deep-layer oxide film forming step is confirmed.

TABLE 2

| heating history | step | film thickness measurement result (nm) |
|---|---|---|
| B-1 | heating up to 350° C. with temperature gradient of 5° C./minute, subsequently heating up to 600° C., and holding heating temperature of 600° C. for 6 hours | after heating forming step of deep-layer oxide film | 28.9 |

B-1 shown in Table 2 indicates a film thickness of the oxide coating film when heating is held for 6 hours at a temperature (600° C.) close to the melting point of 1000-order aluminum-based metal in the deep-layer oxide film forming step. As a result of the measurement, it is found that the film thickness is 28.9 nm.

By comparing this result and the result of holding heating for 3 hours shown in A-3 in Table 1, it is found that by holding heating for a predetermined time at the temperature close to the melting point in the heating forming step of the deep-layer oxide film, the film thickness of the oxide film can be further increased.

Next, the influence which is imparted to the film thickness when the heating is held for a predetermined time at a temperature approximately half of the melting point in the artificial oxide film forming step and, thereafter, the heating temperature is elevated up to a temperature close to the melting point in the deep-layer oxide film forming step and, subsequently, the melting point is held for a predetermined time is confirmed.

TABLE 3

| heating history | step | film thickness measurement result (nm) | | |
|---|---|---|---|---|
| | | first time | second time | third time |
| C-1 | heating up to 350° C. with temperature gradient of 5° C./minute holding heating up to 350° C. for 3 hours heating up to 600° C. holding heating at 600° C. for 6 hours | after heating forming step of deep-layer oxide film | 73.4 | 65.8 | 72.3 |
| C-2 | heating up to 350° C. with temperature gradient of 5° C./minute holding heating up to 350° C. for 3 hours heating up to 600° C. holding heating at 600° C. for 12 hours | after heating forming step of deep-layer oxide film | 129.2 | 103.0 | — |

C-1 in Table 3 indicates a result when heating is held for 3 hours in the artificial oxide film forming step and heating is held for 6 hours in the deep-layer oxide film forming step, while C-2 in Table 3 indicates a result when heating is held for 3 hours in the artificial oxide film forming step and heating is held for 12 hours in the deep-layer oxide film forming step.

It is found from Table 3 that by performing the holding of temperature in two stages in the artificial oxide film forming step and the deep-layer oxide film forming step, an oxide film having a further larger thickness can be formed.

Further, due to results of repeated tests performed twice or three times in series, it is found that the alumina fiber having the substantially stable film thickness can be acquired.

Next, a result of a film thickness measurement test when the aluminum fiber is inputted into and baked in a furnace preliminarily heated at a temperature close to the melting point without making the aluminum fiber subject to the artificial oxide film forming step and the deep-layer oxide film forming step.

TABLE 4

| heating history | film thickness measurement result (nm) | | | |
|---|---|---|---|---|
| | first time | second time | third time | fourth time |
| D-1 heating for 6 hours in furnace which is preliminarily heated at 600° C. | 61.1 | 25.7 | 60.9 | 35.6 |

D-1 in Table 4 shows a result when the oxide film is formed by putting the aluminum fiber in the inside of the furnace which is preliminarily held at a temperature of 600° C. A result of the test which is repeated four times exhibits extremely large irregularities in film thickness. Further, in the second-turn and the fourth-turn of the repeated test, the film thickness of the oxide film assumes values largely below 50 nm. Accordingly, it is found that the oxide film forming method according to this testing method is difficult to form the alumina fiber having favorable heat resistance and favorable dip coating property.

Based on the result of this test, it is found that the artificial oxide film forming step and the deep-layer oxide film forming step contribute to the formation of the stable oxide film.

Furthermore, the result of the test suggests that to acquire the stable film thickness, it is important to heat the aluminum fiber up to the temperature approximately half of the melting point of the aluminum-based metal which constitutes the aluminum fiber at a temperature gradient of 5° C./min and also to hold the temperature approximately half of the melting point for a predetermined time.

By forming the alumina coating film in this manner, the alumina fiber can have the four-layered structure consisting of the natural oxide film, the artificial oxide film, the deep-layer oxide film and the alumina coating film which constitutes the deepest-layer oxide film and a film thickness of the four-layered oxide film is set to 50 nm or more and hence, it is possible to impart the excellent heat resistance to the alumina fiber.

Further, by performing the heating forming treatment of the artificial oxide film, the deep-layer oxide film and the deepest-layer oxide film particularly in air, it is possible to manufacture the high-quality alumina fiber at a low cost.

Here, in the heating forming treatment of the artificial oxide film, the deep-layer oxide film and the deepest-layer oxide film, these films may be formed by continuously elevating the heating temperature. However, in performing such a heating forming treatment, the artificial oxide film and the deep-layer oxide film are continuously formed by continuously elevating the heating temperature of the aluminum fiber up to 600° C. gradually at a temperature gradient of 5° C. or less per minute and, thereafter, the deepest-layer oxide film is formed by heating the aluminum fiber at a temperature which exceeds the melting point of the aluminum fiber.

(6) Surface Areas of Aluminum Fiber and Alumina Fiber

Then, the aluminum fiber is heated up to a temperature (350° C.) which is approximately half of the melting point of 1000-order aluminum-based metal at a temperature gradient of 5° C./min or less and, further, the temperature approximately half of the melting point is held for 3 hours, and the aluminum fiber is heated up to approximately 600° C. which is lower than the melting point by 10%, and the aluminum fiber is continuously baked for 12 hours at maximum to form the alumina fiber. Then, a specific surface area of the alumina fiber is measured.

The specific surface area of the alumina fiber is measured by a Brunauer-Emmet-Teller (BET) Method using Autosorb-1 made by Quantachrome Instruments. Here, prior to the measurement by this method, as a pretreatment, the nitrogen gas conversion is performed at a temperature of 300° C. for 30 minutes.

A result of the specific surface measurement is shown hereinafter.

TABLE 5

| | Heating History | BET value (m$^2$/g) |
|---|---|---|
| E-1 | Before heating | 0.13 |
| E-2 | Heating by elevating temperature up to 350° C. at temperature gradient of 5° C./min holding the heating temperature at 350° C. for 30 minutes | 1.07 |
| E-3 | Heating by elevating temperature up to 350° C. at temperature gradient of 5° C./min holding the heating temperature at 350° C. for 3 hours | 1.47 |
| E-4 | Heating by elevating temperature up to 350° C. at temperature gradient of 5° C./min holding the heating temperature at 350° C. for 3 hours heating by elevating temperature up to 600° C. | 0.98 |
| E-5 | Heating by elevating temperature up to 350° C. at temperature gradient of 5° C./min holding the heating temperature at 350° C. for 3 hours heating by elevating temperature up to 600° C. holding the heating temperature at 600° C. for 3 hours | 0.56 |
| E-6 | Heating by elevating temperature up to 350° C. at temperature gradient of 5° C./min holding the heating temperature at 350° C. for 3 hours heating by elevating temperature up to 600° C. holding the heating temperature at 600° C. for 6 hours | 0.68 |
| E-7 | Heating by elevating temperature up to 350° C. at temperature gradient of 5° C./min holding the heating temperature at 350° C. for 3 hours heating by elevating temperature up to 600° C. holding the heating temperature at 600° C. for 12 hours | 1.01 |

温度: temperature
約600° C.: approximately 600° C.
約350° C.: approximately 350° C.
室温: room temperature
時間: time
3時間: 3 hours Table 5 shows a result of specific surface areas which are measured at respective measuring points ranging from E-1 to E-7.

As a result, the specific surface area is increased by heating and baking up to 350° C., and assumes the maximum 1.47 m$^2$/g after baking at temperature 350° C. for 3 hours (E-3). However, with the succeeding heating up to 600° C., the specific surface area is decreased once. As indicated by (E-5), after being baked at 600° C. for 3 hours, the specific surface area is decreased to 0.56 m$^2$/g to reach a minimum value. However, with the further succeeding baking at 600° C., the specific surface area is increased, and assumes 1.01 m$^2$/g after 12 hours (E-7).

To study these results, it is considered that although the artificial oxide film which is acquired by heating ranging from (E-1) to (E-4) increases the specific surface area thereof along with heating, the artificial oxide film is yet an aggregate of a thin oxide film and hence the artificial oxide film is a fragile film which is loosely bonded with the aluminum-based metal at a deep portion of the fiber.

This understanding is also suggested by a fact that when each fiber acquired by heating ranging from (E-1) to (E-4) is put into a sample bottle or the like and is agitated in a dry state, a peeled powdery oxide film adheres to a wall surface of the sample bottle.

In the heating and baking at 600° C. which is performed subsequently, the loose bonding is tightened to become hard and firm bonding so that the specific surface area is once decreased (E-5).

Thereafter, the film thickness of the deep-layer oxide film is increased along with a lapse of time.

Due to such results, to acquire the alumina fiber having the sufficient film thickness and also having the large specific surface area, it is suggested preferable to adopt the method in which the aluminum fiber is heated up to the temperature approximately half of the melting point of the aluminum-based metal which forms the aluminum fiber at a temperature gradient of 5° C./min or less and, subsequently, the temperature approximately half of the melting point is held for the predetermined time, and the heating temperature is elevated to the temperature close to the melting point, and the heating temperature is held at the temperature close to the melting point for the predetermined time.

Next, the specific surface area of the aluminum fiber which bonds the alumina fine fiber having a fiber diameter of 5 µm to the aluminum fiber having a fiber diameter of 100 µm is measured. As mentioned previously, the crystal alumina fiber having a diameter of approximately 3 to 5µ such as the above-mentioned Maftec (registered trade mark) ALS, MLS-2 is placed on an aluminum fiber aggregate molded in a plate shape, and the aluminum fiber is sieved by finely vibrating the aluminum fiber whereby the alumina fine fiber is uniformly adhered to a surface of the aluminum fiber. In a state that the alumina fine fiber is adhered to the surface of the aluminum fiber, the heating temperature is elevated up to 350° C. in the artificial oxide film forming step, and the heating temperature is held for 3 hours. Thereafter, the heating temperature is elevated up to 600° C. in the deep-layer oxide film forming step and the heating temperature is held at the same temperature for 12 hours thus forming the oxide film.

TABLE 6

| | Heating history | step | BET value ($m^2/g$) |
|---|---|---|---|
| F-1 | heating up to 350° C. with temperature gradient of 5° C./minute holding heating up to 350° C. for 3 hours heating up to 600° C. holding heating at 600° C. for 12 hours | after heating forming step of deep-layer oxide film | 0.96 |

As shown in Table 6, an aluminum fiber F-1 which forms an oxide film thereon together with the ALS has the specific surface area of 0.96 $m^2$ per 1 g.

As described above, according to the formation of the alumina coating film in the method for manufacturing a titania coated alumina fiber aggregate according to the present invention, it is possible to form an alumina layer having a large thickness on an aluminum fiber. This implies that the alumina fibers possess heat resistance and a surface suitable for favorable dip coating.

(7) Titania Coating

Next, the explanation is made with respect to an example in which the alumina fiber aggregate is formed by applying a heating history similar to the heating histories of the aluminum fibers E-1, the alumina fibers E-7 and the alumina fibers F-1 which are prepared in the above-mentioned test to the aluminum fiber aggregate, and titania coating is applied to the alumina fiber aggregate by a dip coating method.

Here, a fiber which is obtained by applying dip coating to the aluminum fiber E-1 is referred to as a titania coating aluminum fiber so as to distinguish the fiber from a titania fiber which is obtained by applying titania coating to an alumina fiber, and an aggregate which is formed by aggregating the titania coating aluminum fibers is referred to as a titania coating aluminum fiber aggregate.

The alumina fiber aggregate which has anatase-type titania coating (hereinafter, simply referred to as a titania coated alumina fiber aggregate) can be formed also using an alumina fiber aggregate which is prepared through a deep-layer oxide film forming step. However, with respect to a rutile-type titania coated alumina fiber aggregate, it is necessary to heat and bake the rutile-type titania coated alumina fiber aggregate up to a temperature of approximately 750° C. in a heating and baking process and hence, it is preferable to use an alumina fiber aggregate which has a deepest-layer oxide film.

In this dip coating method is a method, an alumina fiber aggregate or an aluminum fiber aggregate is immersed in a sol liquid containing a titania compound, and is pulled up from the sol liquid, and the sol liquid adhered to a surface of the alumina fiber aggregate or the aluminum fiber aggregate is dried thus forming a titania thin film on the alumina fiber aggregate or the aluminum fiber aggregate.

When the sol liquid used in the dip coating method is constituted of a titanium compound, a solvation agent and a solvent, a ratio of these components, that is, a molar ratio, is preferably set to approximately 1:0.5:5 to 1:10:00 in general, for example, and is more preferably set to approximately 1:1:10 to 1:5:50. On the other hand, when the sol liquid is constituted of a titanium compound, chelation ligand and a solvent, a ratio of these components is preferably set to approximately 1:0.1:5 to 1:10:100 in general, for example, and is more preferably set to approximately 1:0.5:10 to 1:5:50.

For example, it is possible to form respective titania thin films by preparing following two kinds of sol liquids.

Sol A Liquid:

A sol liquid which is obtained by mixing titanium tetra isopropoxide, diethanolamine and ethanol at a molar ratio of 1:2.5:34.

Sol B Liquid:

A sol liquid which is obtained by mixing titanium tetra isopropoxide, acetylacetone, deionized water and ethanol at a molar ratio of 1:1:3:20.

The alumina fiber aggregate or the aluminum fiber aggregate is immersed in these sol liquids for a fixed time and, thereafter, the immersed alumina fiber aggregate or the immersed aluminum fiber aggregate is taken out from the sol liquid, and is subject to primary drying in air.

After completion of the primary drying, the alumina fiber aggregate or the aluminum fiber aggregate is heated and baked in a muffle furnace (FO300 made by YAMATO SCIENTIFIC CO., LTD.) in an air atmosphere. The determination of the maximum temperature in this heating treatment is reviewed at a pitch of 50° C. within a range from 300° C. to 550° C., and it is found that an anatase type photocatalytic reaction is most preferably induced at the maximum temperature of 450° C. It is preferable to elevate a temperature to induce the reaction gradually in the heating step. That is, to apply the coating most efficiently, the alumina fiber aggregate or the aluminum fiber aggregate is heated up to a temperature of 450° C. from a room temperature at a temperature elevation ratio of 2° C. per minute, the temperature is held for 3 hours and, thereafter, the alumina fiber aggregate or the aluminum fiber aggregate is cooled naturally. To induce the rut ile type photocatalytic reaction which exhibits the less photocatalytic ability but is a visible light response type photocatalytic reaction, it is necessary to hold the baking temperature at 750° C.

By performing the above-mentioned immersing, overheating and baking operation one time, the titania coating film having a film thickness of approximately 140 nm is formed on the E-7 alumina fiber which constitutes the alumina fiber aggregate. By repeating this operation three times in total, the titania coating film having a film thickness of approximately 400 nm is formed on the alumina fiber thus finally producing a functional catalytic fiber which exhibits a photocatalytic function as a titania coated alumina fiber aggregate.

Further, by repeatedly applying dip coating to the aluminum fiber aggregate E-1 three times in the same manner, it is possible to form a titania coating aluminum fiber aggregate with the titania thin film having a film thickness of 400 nm.

Here, with the use of the above-mentioned sol liquid A or sol liquid B, it is possible to apply dip coating to the alumina fine fiber aggregate such as Maftec (registered trade mark) ALS or MLS-2. However, the alumina fine fiber aggregate are formed of fine fibers and hence, the sol liquid is non-uniformly adhered to the alumina fiber aggregate. Accordingly, titania dip coating to the alumina fine fiber aggregate such as Maftec (registered trade mark) ALS or MLS-2 is performed by a following method while preventing the non-uniform adhesion of the sol liquid.

That is, the sol liquid for dip coating the alumina fine fiber aggregate such as Maftec (registered trade mark) ALS or MLS-2 is prepared by setting a molar ratio of titanium tetra isopropoxide:ethanol:acetylacetone:distilled water to 1:20:3:6 (hereinafter, referred to as sol C liquid). The sol C liquid which is prepared at this molar ratio exhibits lower viscosity thus easily infiltrates into pores formed in the fibers and hence, the sol C liquid is preferably used for applying coating to fine fibers and, particularly, for applying titania coating to alumina fine fibers.

To be more specific, the prepared sol C liquid is poured into a stainless-made vat and, the alumina fine fiber aggregate is immersed in the sol C liquid in the vat.

Next, ultrasonic vibrations of an intermediate wavelength is applied to the sol C liquid for 15 minutes and, thereafter, the sol liquid is held in a still state for 45 minutes. In this manner, by applying the ultrasonic vibrations of the intermediate wavelength to the sol C liquid, a solution can sufficiently infiltrate into the inside of fiber mesh and hence, it is possible to perform coating to a deep portion of the fiber net. Although a time for applying ultrasonic vibrations is set to 15 minutes in this embodiment, it is preferable to set the time to 30 seconds to 30 minutes. It is because when the time for applying ultrasonic vibrations is equal to or less than 30 seconds, there exists a possibility that the sol liquid does not sufficiently infiltrate into fibers, while when the ultrasonic vibrations are applied more than 30 minutes, there exists a possibility an adverse effect is applied to the alumina layer of the alumina fiber. Here, the use of ultrasonic vibrations of low wavelength may damage or peel off the adhered titania layer and hence, it is considered that the use of ultrasonic vibration of the low wavelength is not preferable.

Although the sol C liquid is held in a still state after the ultrasonic treatment for 45 minutes according to this embodiment, the time is not particularly limited and hence, it is sufficient to hold the sol C liquid in a stationary state for approximately 1 minute to 24 hours.

The alumina fine fiber aggregate immersed in the sol C liquid for 1 hour is gradually taken out from the sol C liquid, and the primary drying of the alumina fine fiber aggregate is performed by keeping the alumina fine fiber aggregate in air at normal temperature for 2 hours or more. In performing the primary drying, the sol C liquid adhered to the alumina fine fiber aggregate can be dried more efficiently by performing air-drying. Further, drying may be accelerated by radiating infrared rays to fibers or fiber aggregate to which sol liquid is adhered.

Next, after the sol C liquid adhered to the alumina fine fiber aggregate is dried, the alumina fine fiber aggregate is heated to fix titania to the alumina fine fiber aggregate. In heating the alumina fine fiber aggregate in a muffle furnace in an air atmosphere, it is preferable to set a temperature elevation ratio to 2° to 15° C. per minute from room temperature. In this embodiment, the alumina fine fiber aggregate is heated up to a temperature of 450° C. at a temperature elevation ratio of 2° C., and the temperature is held for 3 hours and, thereafter, the alumina fine fiber aggregate is cooled naturally.

By repeatedly performing the above-mentioned series of steps of immersing the alumina fiber aggregate into sol C liquid, and succeeding air-drying and heating for fixing titania on the alumina fiber aggregate three times or more, the titania coating is applied to the alumina fine fiber aggregate thus preparing the titania coated alumina fiber aggregate.

In this embodiment, titania coating is performed while applying the ultrasonic treatment only to the sol C liquid. However, the ultrasonic treatment may be applied to the liquid also in performing titania coating using the sol A liquid or the sol B liquid. Further, before drying, a gas may be sprayed to the alumina fiber aggregate which is pulled up from the sol liquid thus allowing the gas to be sprayed to contact points between the alumina fibers constituting the alumina fiber aggregate. Due to such spraying, it is possible to prevent the formation of lumps made of a dried material of the sol liquid from on a fiber surface, and it is also possible to a uniform liquid coating state also in the vicinity of the contact point. Further, the sol liquid may contain 15 to 25 weight % of titanium diisopropoxybis(acetylacetonate), 5 to 10 weight % of isopropyl alcohol, 55 to 75 weight % of ethanol, and 5 to 10 weight % of water. By performing titania coating using a sol liquid having such composition (sol D liquid), compared to the sol C liquid, it is possible to perform titania coating which is more uniform and less peelable. Further, in the sol D liquid, a mixing ratio of titanium diisopropoxybis(acetylacetonate), ethanol and water may be set to 3.5:9:1. With the use of the sol D liquid having such a mixing ratio, a stronger titania thin film can be formed. The immersion of the alumina fiber aggregate in the sol liquid is performed in the inside of a hermetically-sealed vessel having a volume larger than a volume of the stored sol liquid using a sol liquid at a temperature of 35° C. to 60° C. The alumina fiber aggregate may be immersed while evaporating alcohol contained in the sol liquid thus increasing a pressure of a gas phase in the hermetically-sealed vessel. By performing titania coating in this manner, it is possible to precipitate extremely fine titania on surfaces of fibers while preventing the precipitation in the sol liquid so that a uniform titania thin film can be formed on the surfaces of fibers.

(8) Pigment Decomposition Test

Next, to study a photocatalytic performance of the titania coating aluminum fiber aggregate prepared using E-1 and the titania coated alumina fiber aggregate prepared using E-7 and F-1, a decomposition performance test of pigment is performed. Further, a decomposition performance test of pigment is also simultaneously performed on samples which are obtained by applying titania coating on alumina fine fibers.

That is, following eight kinds of samples are served for the test.

Cont.: Alumina fiber aggregate to which titania coating is not applied (control).

Sample 1: E-1 aluminum fiber aggregate to which titania coating is applied using sol A liquid Sample 2: E-7 alumina fiber aggregate to which titania coating is applied using sol B liquid Sample 3: E-7 alumina fiber aggregate to which titania coating is applied using sol C liquid Sample 4: F-1 alumina fiber aggregate using Maftec (registered trade mark) ALS to which titania coating is applied using sol C liquid Sample 5: F-1 alumina fiber aggregate using Maftec (registered trade mark) MLS-2 to which titania coating is applied using sol C liquid Sample 6: Maftec (registered trade mark) ALS to which titania coating is applied using sol C liquid Sample 7: Maftec (registered trade mark) MLS-2 to which titania coating is applied using sol C liquid Further, as an object to be decomposed, methylene blue (methylene blue: 3,7-bis(dimethlamino) phenothiazine-5-ium chloride) is used.

A pigment decomposition test is performed such that 1 g of each fiber is put in the inside of an albedo magnetism container, and 10 ml of methylene blue solution of 0.1% is poured into each albedo magnetism container and, thereafter, ultraviolet rays are radiated to the fiber in the solution from two blacklight.

As a result, in all samples except for the control, decomposition action of methylene blue is confirmed. Further, among these samples, the sample 3 exhibits the strongest decomposition action of methylene blue following the sample 6 and the sample 7. Due to such a result, at this stage, it is determined that the sol C liquid exhibits the strongest photocatalytic action. With respect to the titania coating applied to the titania fine fibers of the sample 6 and the sample 7, it is determined that titania coating mainly acquires a strong photocatalytic function due to the enlargement of a coating area of the fiber of the base material related to the diameter of the fiber.

(9) Deodorization Test

Next, to examine deodorization ability of a titania coating aluminum fiber aggregate which is obtained by applying titania coating to the aluminum fiber aggregate E-1 (hereinafter, referred to as titania coating E-1) and titania coated alumina fiber aggregates respectively formed of the alumina fiber aggregate E-7 and the alumina fiber aggregate F-1 (hereinafter, respectively referred to as E-7 titania coated alumina fiber aggregate and F-1 titania coated alumina fiber aggregate) attributed to the photocatalytic action, a test which discomposes acetaldehyde sealed in a hermetically-sealed vessel is per formed.

First of all, the explanation is made with respect to the acetaldehyde decomposition test performed on the titania coating E-1 and E-7 titania coated alumina fiber aggregate. In this test, as a comparison sample, a non-woven fabric (made by NB company) to which a photocatalytic function is imparted is also served for the test.

First of all, to remove extra components made of titanium oxide which are adhered to the fibers, ultrasonic cleaning is applied to the fiber aggregate served for the test for 5 minutes and the fiber aggregate is deionized using distilled water. Thereafter, the fiber aggregate is baked again at a temperature of 200° C. for two hours.

Here, test samples which are cut into a 50 mm-square shape are stored in the glass-made hermetically-sealed vessel having a predetermined capacity. After confirming the test samples being in a steady state, ultraviolet rays are radiated to the test samples. In this case, changes with time of acetaldehyde concentration and carbon dioxide concentration in the inside of the vessel are measured using a gas chromatograph device (GC-8A type made by SHIMADZU CORPORATION). Data which is obtained by performing the deodorization test in this manner is shown in FIG. 4.

Figure 4B:
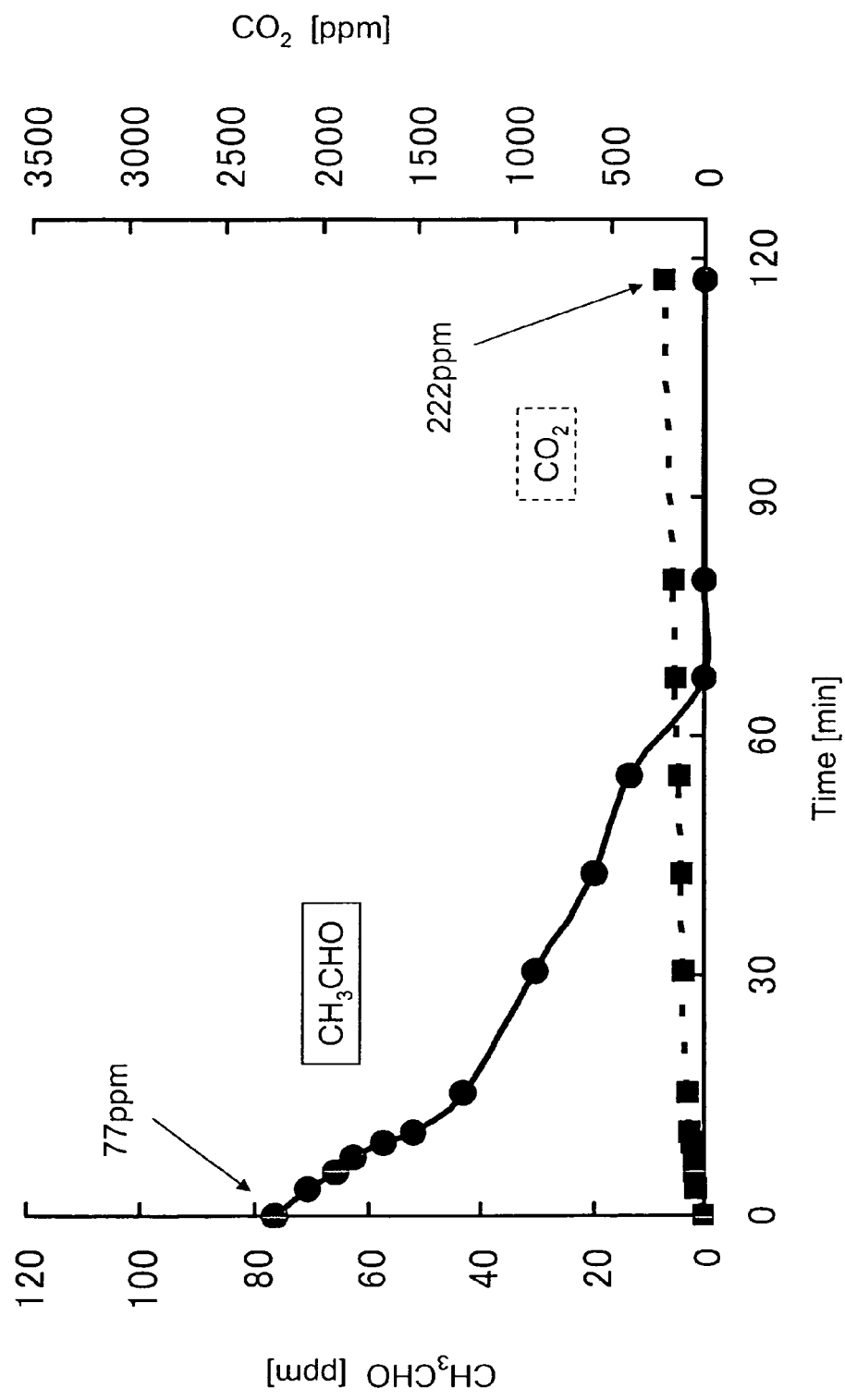
Figure 4C:
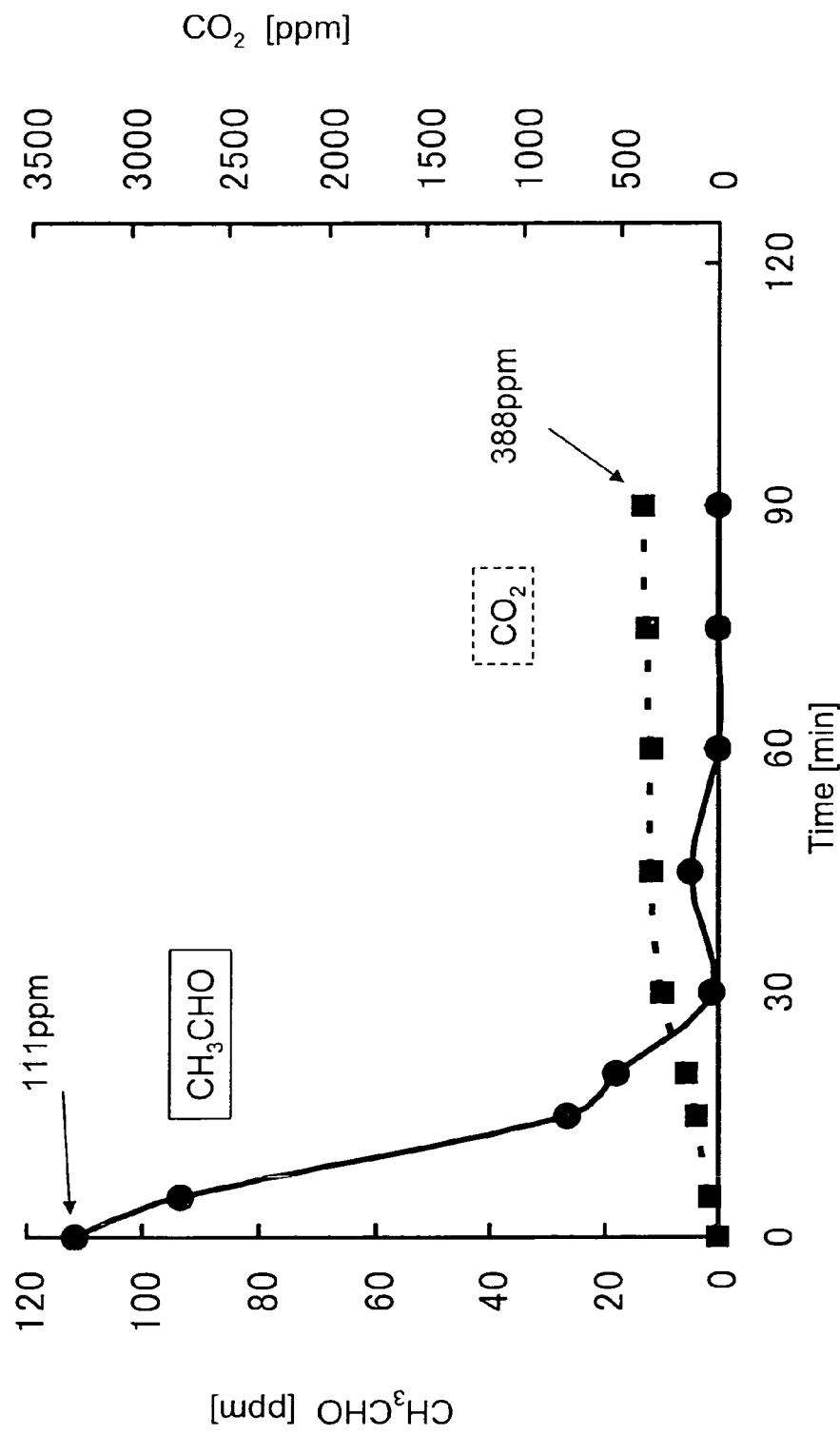

FIG. 4 (a) shows a result of the test of 2 g of the non-woven fabric made by NB company, FIG. 4(b) shows a result of the test of 2 g of the titania coating E-1, and FIG. 4(c) shows a result of the test of 2.5 g of E-7 titania coated alumina fiber aggregate.

In the non-woven fabric shown in FIG. 4(a), for approximately 50 minutes after starting the test, a tendency in which the acetaldehyde concentration is slightly decreased is observed. Thereafter, the acetaldehyde concentration is sharply decreased, and assumes a value equal to or below a detection limit or less when 100 minutes lapses after starting the test.

Further, the carbon dioxide concentration is simultaneously increased with the starting of radiation of ultraviolet rays, and assumes 3291 ppm, that is, a maximum value, at a point of time that 200 minutes lapse after starting the test.

With respect to the titania coating E-1 indicated by (b), the concentration of acetaldehyde is sharply lowered immediately after the radiation of ultraviolet rays and assumes a value equal to or below a substantially detection limit after a lapse of 75 minutes from starting of the radiation of ultraviolet rays. However, the concentration of carbon dioxide remains at 222 ppm ever after a lapse of 120 minutes. To study this result, it is found that although the non-woven fabric to which the photo-catalyst is applied generates a large quantity of carbon dioxide simultaneously with the radiation of ultraviolet rays, the titania-coating E-1 fiber aggregate does not generate a large quantity of carbon dioxide in spite of the rapid dissipation of acetaldehyde. That is, it is found that acetaldehyde which is once absorbed in the titania layer formed by the above-mentioned titania coating due to the photocatalytic reaction is gradually decomposed. From this phenomenon, it is found that the titania coating fiber exhibits a light induced absorbing function. The E-1 fiber with no titania coating possesses neither an absorbing function nor the light induced absorbing function (not shown in the drawing) and hence, it is determined that this absorbing function derives from an intrinsic ability of this titania coating attributed to the compositions of respective sol A liquid, sol B liquid and sol C liquid.

With respect to titania coating E-7 indicated by (c), the concentration of acetaldehyde is sharply lowered immediately after the radiation of ultraviolet rays and assumes a value equal to or below a substantially detection limit after a lapse of 30 minutes from starting of the radiation of ultraviolet rays. Acetaldehyde which is absorbed once is gradually decomposed, and assumes a maximum 388 ppm after a lapse of 90 minutes from starting of the radiation of ultraviolet rays. From this, it is found that by changing abase material of coating from aluminum fiber to alumina fiber, the photocatalytic action is remarkably increased thus increasing both of the light induced absorbing function and the decomposition.

This implies that the alumina fiber is not limited to the absorption of harmful substances. For example, even when a functional catalyst such as titanium oxide or platinum is carried by the alumina fiber, the alumina fiber can firmly hold the functional catalyst. That is, the titania coated alumina fiber aggregate obtained by the method for manufacturing a titania coated alumina fiber aggregate according to the present invention have possibility of being used as the excellent catalytic base material.

Subsequently, an acetaldehyde decomposition test is also performed with respect to the F-1 titania coated alumina fiber aggregate. Further, alumina fine fibers (Maftec (registered trade mark) ALS) to which titania coating using the sol C liquid is applied is served for a test. Further, the concentration of acetaldehyde before the radiation of ultraviolet rays is approximately 250 to 350 ppm in this embodiment so as to confirm the decomposition with respect to acetaldehyde of the concentration higher than the concentration of acetaldehyde in the previous test. Weights of respective specimens served for this test are set to 1 g.

Figure 5A:
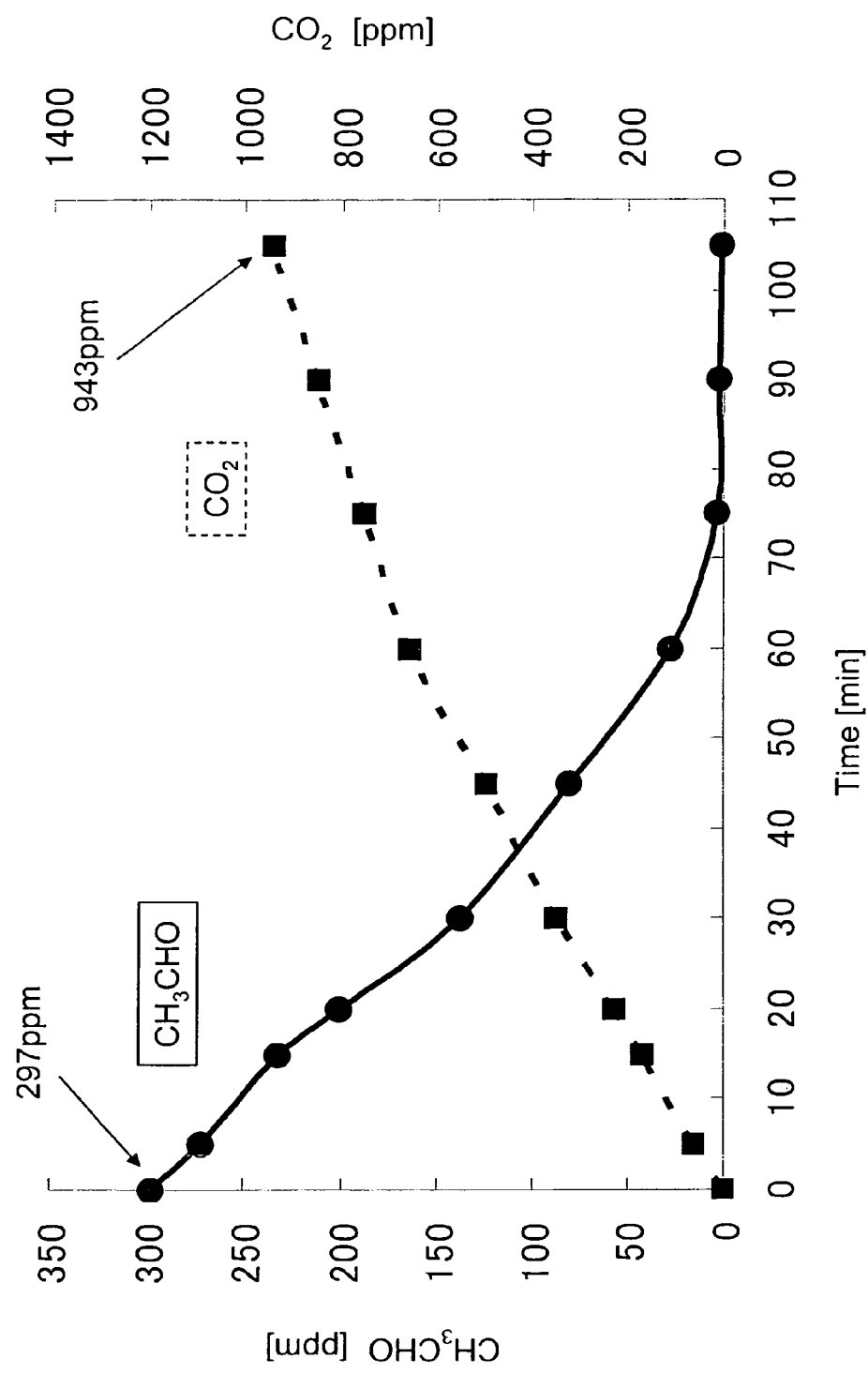
Figure 5B:
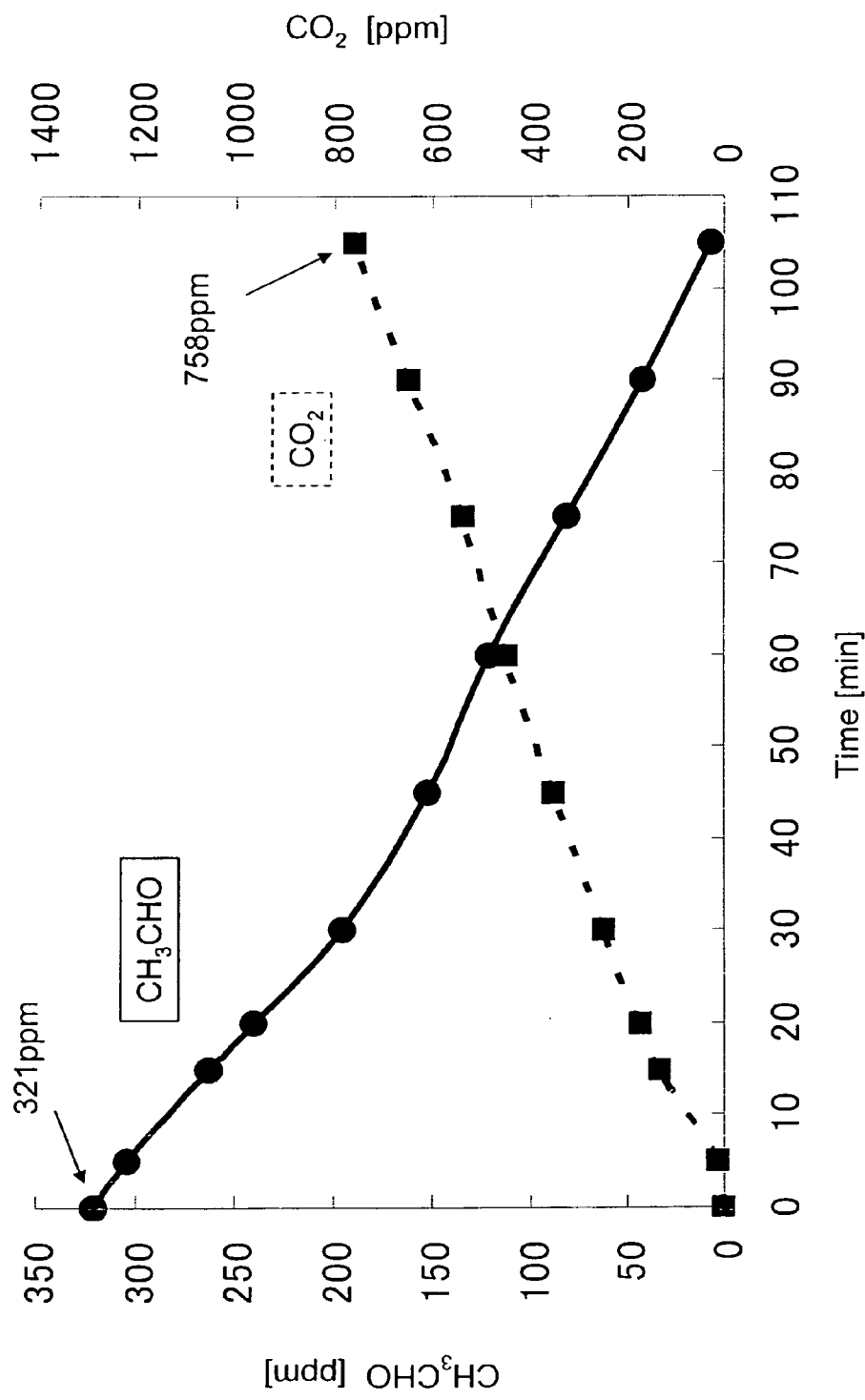

Sample 1: E-7 titania coated alumina fiber aggregate
Sample 2: F-1 titania coated alumina fiber aggregate to which Maftec (registered trade mark) ALS is bonded
Sample 3: titania coating to Maftec (registered trademark) MLS-2 using sol C liquid FIG. 5(a) shows a result of the test on a sample 1, FIG. 5(b) shows a result of the test on a sample 2, and FIG. 5(c) shows a result of the test on a sample 3. It is found from FIG. 5(a), FIG. 5(b) and FIG. 5(c), all samples have the excellent photocatalytic ability.

To focus on FIG. 5(a) first of all, this drawing shows that the E-7 titania coated alumina fiber aggregate which is served for the previous test decomposes the substantially whole acetaldehyde within 75 minutes even under acetaldehyde of higher concentration and hence, the E-7 titania coated alumina fiber aggregate has the strong acetaldehyde decomposing ability. Titania fiber has a large specific surface area with a BET value thereof set to 1.35 $m^2$/g. Further, in spite of the fact that the initial concentration of acetaldehyde is increased three times, a generation quantity of carbon oxide is small, and hence, it is suggested that the titania coated alumina fiber aggregate according to the present invention to which titania coating is applied exhibits the excellent substance absorbing ability.

Further, it is found that F-1 titania coated alumina fiber aggregate shown in FIG. 5(b) possesses the excellent photocatalytic ability. A specific surface area of the F-1 titania coated alumina fiber aggregate is 0.77 $m^2$ g.

Further, as shown in FIG. 3(c), it is observed that the sample 3 is observed to possess the extremely excellent photocatalytic ability and hence, the dip coating with the previously mentioned sol C liquid uses the liquid which can be easily applicable to the ultra-fine fiber such as alumina fine fiber without selecting a fiber diameter of the fine fiber. Further, although Maftec (registered trade mark) MLS-2 contains approximately 28% of carbon dioxide, Maftec (registered trade mark) MLS-2 exhibits the high photocatalytic ability and hence, it is suggested that the favorable dip coating is applied to Maftec (registered trade mark) MLS-2. It is also suggested that the sol C liquid is a sol liquid which is applicable by dip coating to alumina containing silicon dioxide. A specific surface area of the sample 3 (MLS-2 alumina fine fiber to which titania coating is applied) is 9.31 $m^2$/g.

(10) NOx Decomposition Test

Figure 6A:
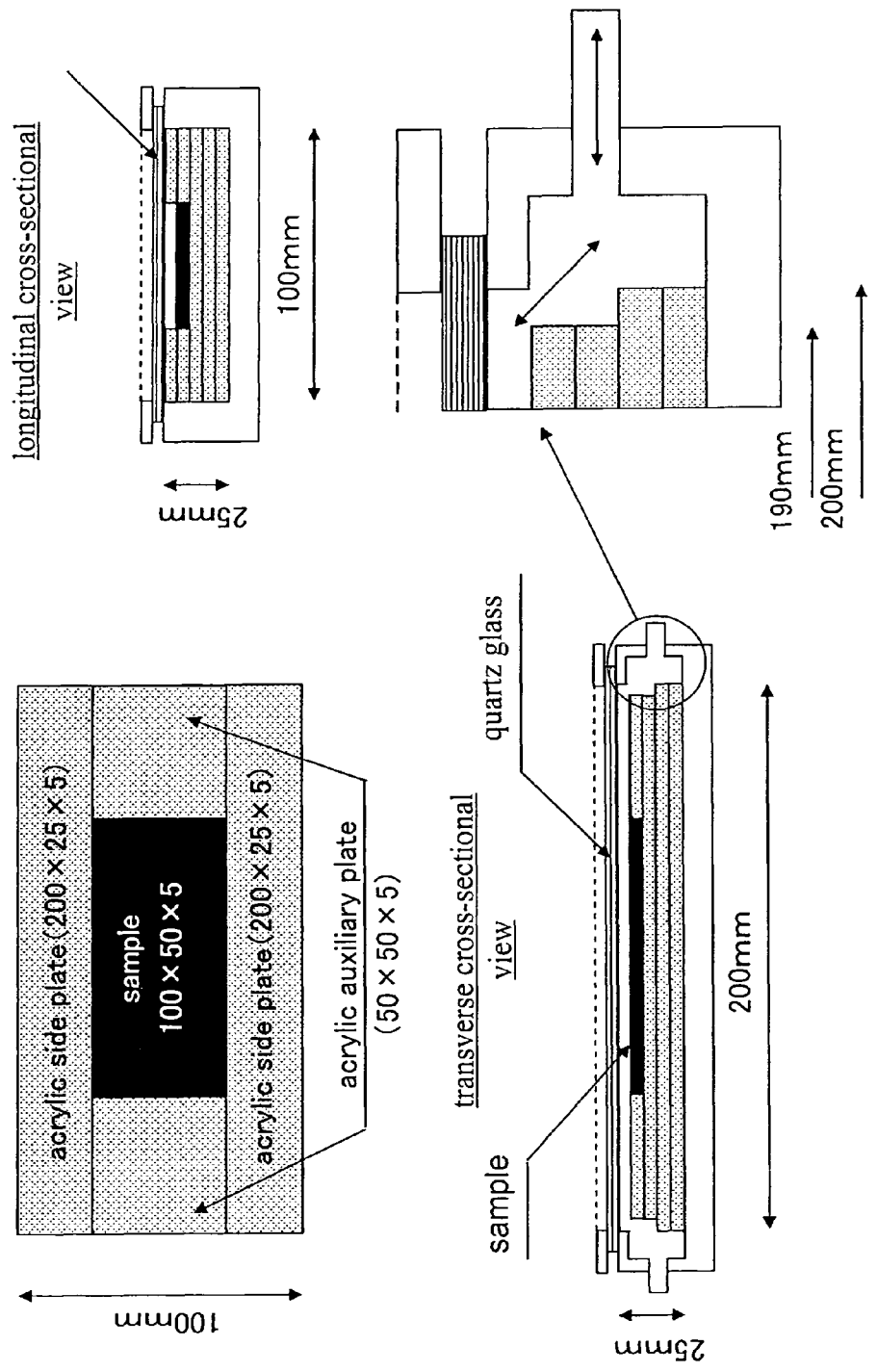
FIGS. 6A, 6B are explanatory views showing a testing method of an NOx decomposition test of the titania coated alumina fiber aggregate.
Figure 6B:
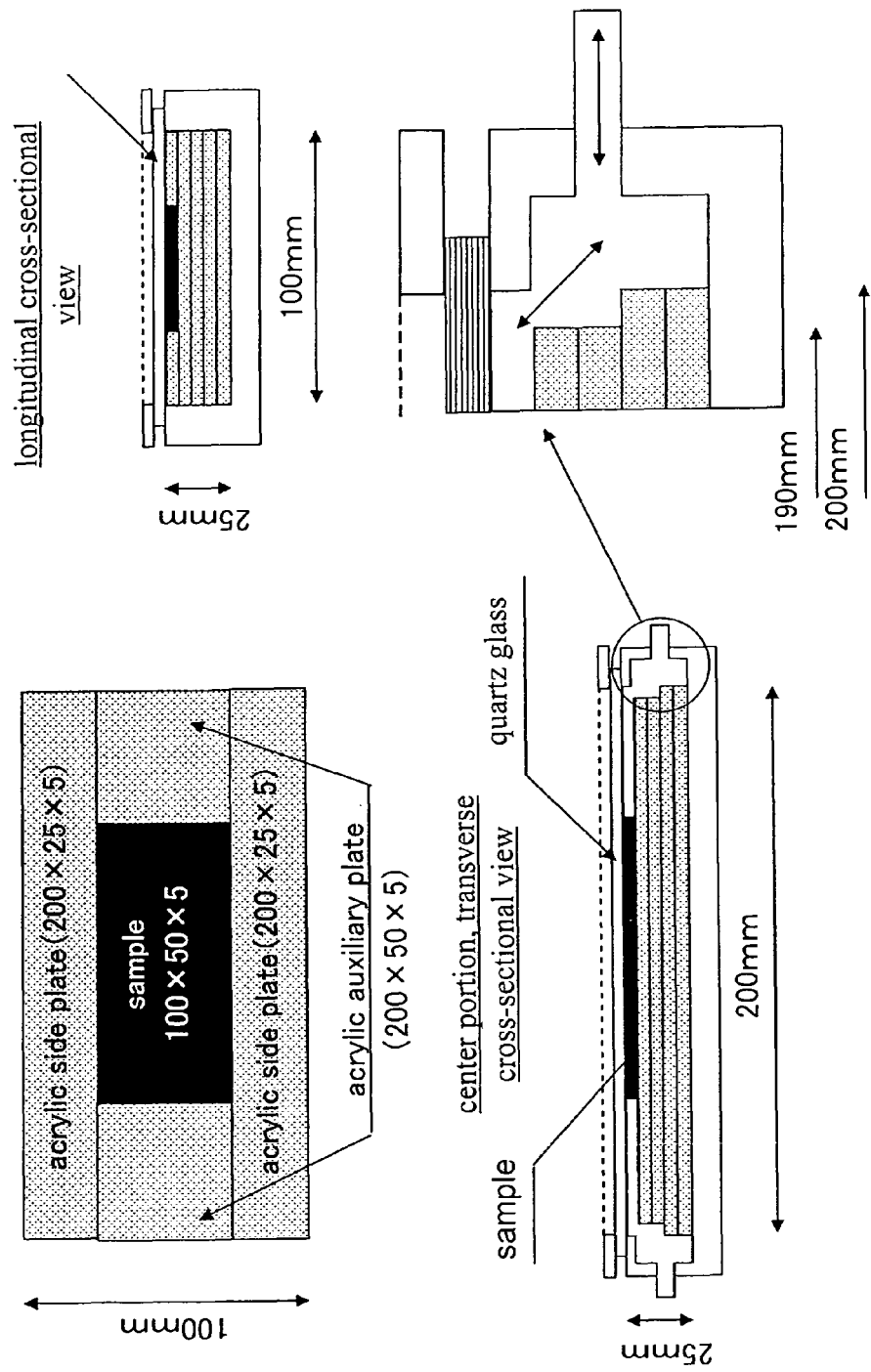

Next, the C-2 titania coated alumina fiber aggregate or a comparison material is stored in a testing device shown in FIG. 6, and a NOx test is performed by supplying NO (carbon monoxide) to the testing device. This testing method is a method which inventors of the present invention originally have improved and is similar to a JIS method. Since the sample has the fiber shape and hence, the evaluation of the sample is performed by allowing NOx (carbon monoxide) to pass the inside of the fiber. Here, a testing device served for the JIS method is shown in FIG. 6(a) and a JIS modified method which the inventors of the present invention tested is shown in FIG. 6(b).

As shown in FIG. 6(a), in this JIS method, only a change of NO gas which passes a surface of the fiber can be measured. On the other hand, in the E-7 titania coated alumina fiber aggregate, the change of the NO gas is generated in the pore portions of the wire-wool-shaped fiber. Accordingly, it is impossible to perform the sufficient evaluation with the usual JIS method. Accordingly, the inventors of the present invention perform the evaluation of samples by applying the JIS modified method shown in FIG. 6(b) which is configured to allow the NO gas to pass the inside of the fiber aggregate.

In this test, in accordance with the JIS method, 1 ppm of NO (nitrogen monoxide) is supplied to the sample from an upstream side of the testing device at a flow rate of 3.0 L/min at a temperature of 25±2.0° C., the gas which reaches the downstream side of the testing device after passing the sample is analyzed by an NOx analyzer, and data is collected. Due to passing of gas through the sample, it is confirmed that there is no pressure loss in the inside of the circuit. In this test, the test which allows NO to pass the E-7 titania coated alumina fiber aggregate without radiating ultraviolet rays and the test which allows NO to pass the E-7 titania coated alumina fiber aggregate while radiating ultraviolet rays are performed.

Figure 7B:
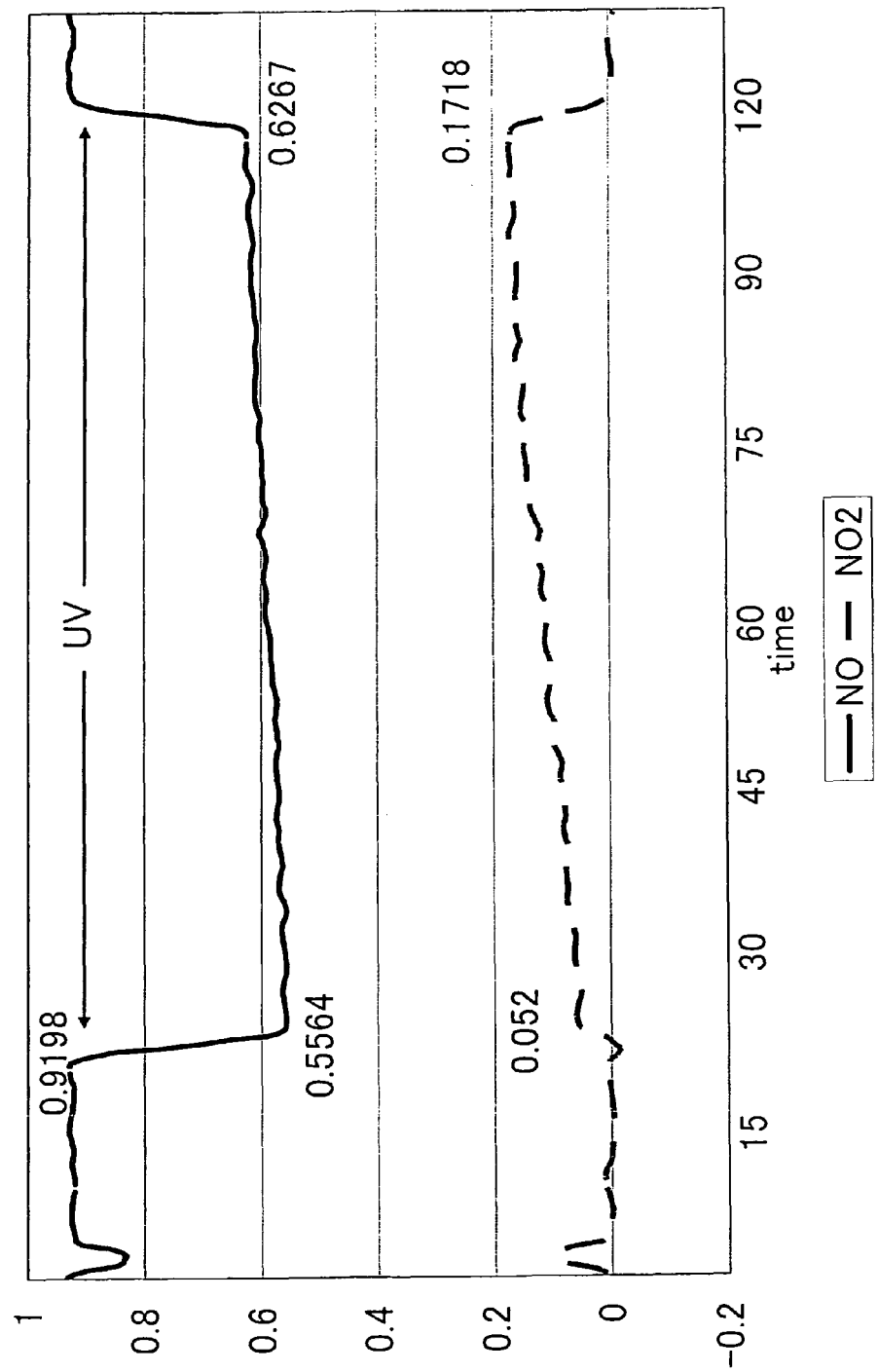

A result of the test is shown in FIG. 7. As can be understood from FIG. 7(a), the NO concentration of the gas is sharply reduced to 0.54 ppm from 0.95 ppm which is the concentration before starting the radiation of ultraviolet rays, and the NO concentration of the gas sampled downstream side of the device is held at 0.68 ppm even when the time exceeds 60 minutes. Next, the result of the evaluation after performing the JIS modified method is shown in FIG. 7(b). As can be understood from FIG. 7(b), the NO concentration of the gas at the time of starting the radiation of ultraviolet rays is 0.54 ppm, and the NO concentration of the gas is maintained at 0.62 ppm even after a lapse of 120 minutes. On the other hand, it is understood that the $NO_2$ concentration is decomposed to 28% of the NO concentration.

Next, to compare the NO decomposition action of the E-7 titania coated alumina fiber aggregate to which the dip coating is applied three times at the time of performing the titania coating and the NO decomposition action of the E-7 titania coated alumina fiber aggregate to which the dip coating is applied four times at the time of performing the titania coating, the NO decomposition test is performed.

Figure 8A:
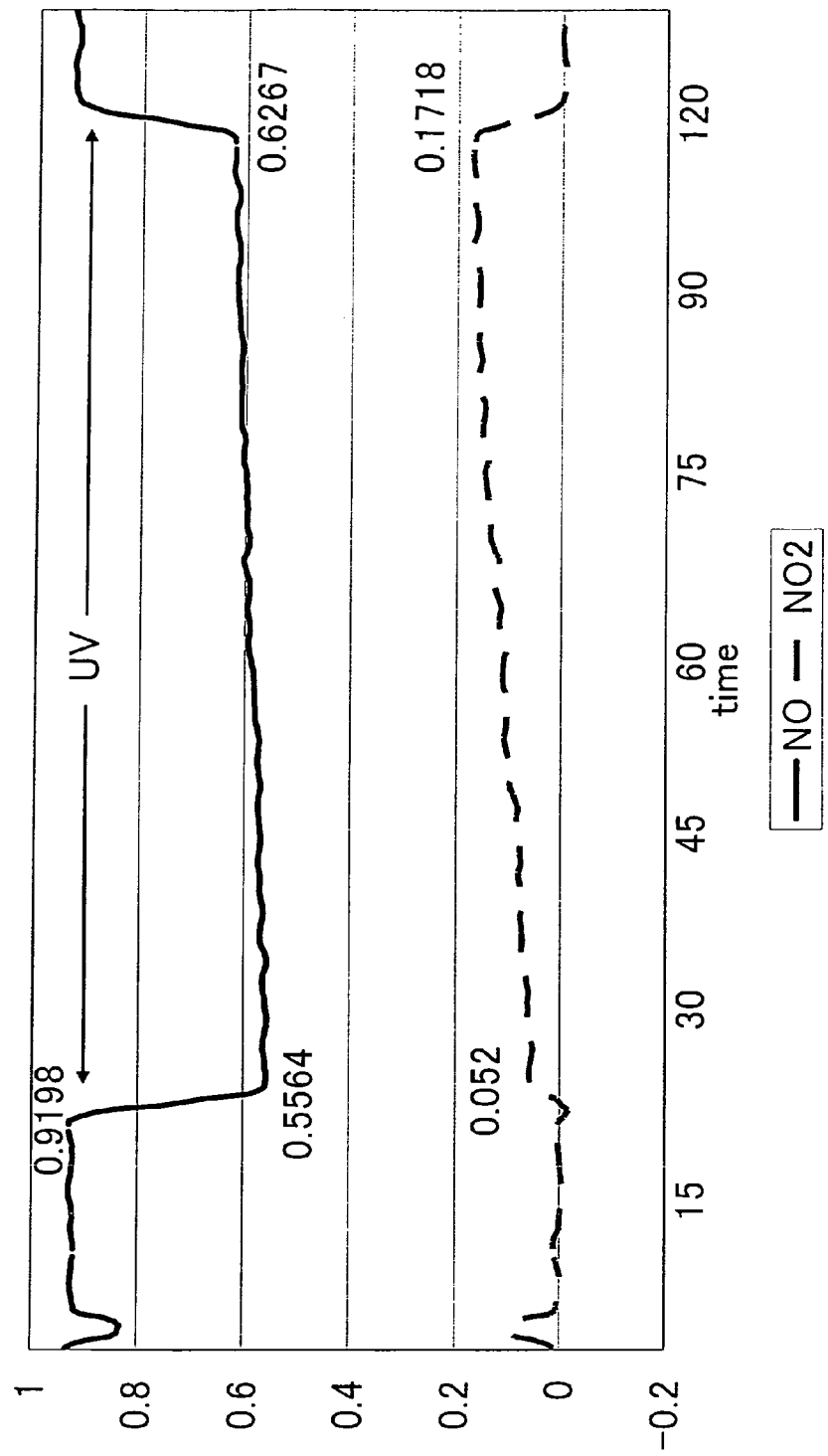
FIGS. 8A, 8B are explanatory views showing a result of the NOx decomposition test of the titania coated alumina fiber aggregate.
Figure 8B:
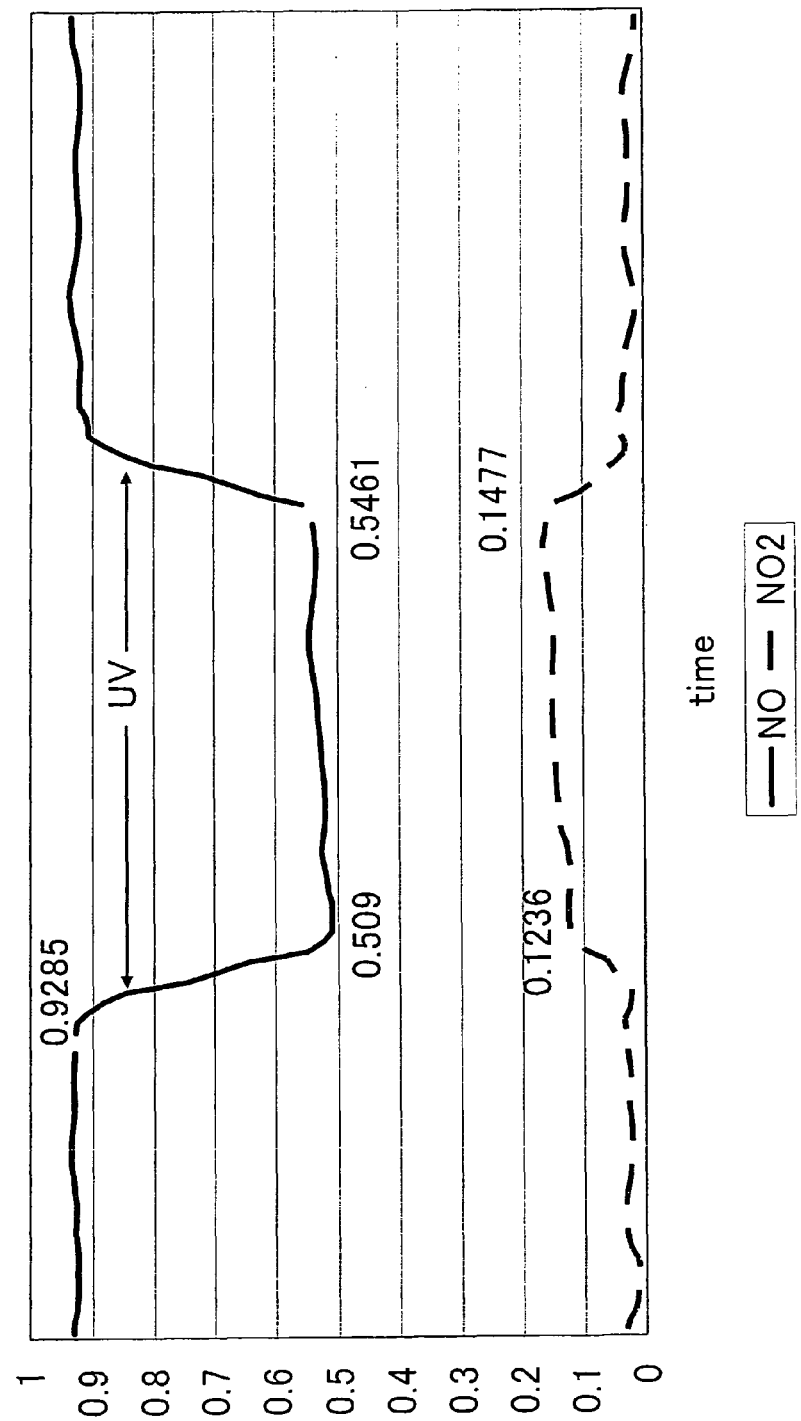

FIG. 8(a) shows a test result of the NO decomposition test of the E-7 titania coated alumina fiber aggregate to which the dip coating is applied three times, and FIG. 8(b) shows a test result of the NO decomposition test of the E-7 titania coated alumina fiber aggregate to which the dip coating is applied four times.

As a result, while the concentration of NO gas is reduced to approximately 0.56 ppm from approximately 0.92 ppm due to the radiation of ultraviolet rays in FIG. 8(a), the concentration of NO gas is reduced to approximately 0.51 ppm from approximately 0.93 ppm due to the radiation of ultraviolet rays in FIG. 8(b).

From this, it is found that it is possible to generate a further favorable photocatalytic action by performing the dip coating a large number of times.

(11) Example in which Titania Fiber or Titania Coated Alumina Fiber Aggregate is Applied to the Sterilization, Insecticide, Decomposition of Organic Substances in Water The titania fiber or the titania coated alumina fiber aggregate is made to function as a photocatalyst which generates environment improving ions which are referred to as so-called minus ions or ion clusters such as radical groups of $OH^-$ or $O^-$.

That is, for example, the titania fiber or the titania coated alumina fiber aggregate can perform oxidizing and decomposing treatment of harmful substances in gas such as acetaldehyde, formaldehyde, xylene, toluene, styrene, hydrogen sulfide, methyl mercaptan, methyl sulfide, trimethylamine, isovaleric acid, ammonia, nitrogen oxide, sulfur oxide, for example, and, at the same time, can be used for the sterilization of bacteria and viruses.

However, a reaction in such a gas phase is held for an extremely short time due to instability of the reaction, and the reaction is a reaction which occurs in extreme vicinity of the photocatalyst and hence, the decomposition treatment of the harmful substances and the sterilization of bacteria and the like are limited to a case in which the harmful substances are in contact with a surface of the photocatalyst.

Then, if it is possible to impart the function of active oxygen species which the environment improving ions possess to water and to make use of this oxidizing reaction, even when the harmful substances are remote from the surface of the photocatalyst, it is possible to make the strong oxidizing action attributed to the active oxygen species at portions remote from the surface of the photocatalyst in time and space. This water contains a large quantity of active oxygen species generated by the photocatalytic reaction and hence, such water is defined as photocatalytic reaction water.

That is, as the photocatalytic reaction water generating device, there is provided a photocatalytic reaction water generating device which can perform cleaning by making use of an oxidizing reaction which uses the photocatalytic reaction water. Here, cleaning implies, not to mention removing smears adhered to the substance, a concept such as the sterilization of microorganism or the oxidizing decomposition of organic materials.

The photocatalytic reaction water is generated by bringing water into contact with titania coated alumina fiber aggregate and by radiating ultraviolet rays to the titania coated alumina fiber aggregate. Here, a ray source of ultraviolet ray is not particularly limited and may be any ray source which can radiate ultraviolet rays of 340 nm to 370 nm such as an ultraviolet ray lamp (black light), an LED or sunbeams.

Further, in radiating the ultraviolet rays to the photocatalyst in water, the ultraviolet rays radiated from the ultraviolet ray source above water are introduced into water by way of an optical fiber and, at the same time, an end portion of the optical fiber is made to face the photocatalyst and hence, the ultraviolet rays can be radiated to a desired portion of the photocatalyst. Further, even when water is smeared, by introducing the ultraviolet rays into water using the optical fiber, it is possible to easily allow the ultraviolet rays to reach the photocatalyst.

The dissolved oxygen concentration of water for producing photocatalytic reaction water by bringing the water into contact with the photocatalyst may be preliminarily increased. The higher the dissolved oxygen concentration of water, the more the photocatalytic reaction water on the surface of the titania coated alumina fiber aggregate is activated and hence, a large quantity of active oxygen species is generated thus efficiently producing the photocatalytic reaction water.

Further, in generating the photocatalytic reaction water, at a position where ultrasonic waves reach, an ultrasonic vibrator which can oscillate in water may be provided. Due to the vibrations of the titania fiber caused by ultrasonic waves, it is possible to efficiently diffuse active oxygen species generated on the surface of the titania fiber into water. That is, the titania coated alumina fiber aggregate which constitutes the photocatalyst is an aggregate of a large number of titania fibers thus forming a porous body and hence, the titania coated alumina fiber aggregate possesses an extremely large surface area whereby a large quantity of active oxygen species is generated. Further, simultaneously with the generation of active oxygen species, the generated active oxygen species are readily removed from the surface of the titania coated alumina fiber aggregate by vibrations due to the vibrations of ultrasonic waves and a large quantity of removed active oxygen species floats in water. Further, new active oxygen species are instantaneously generated and are removed again due to the ultrasonic vibrations and float in water again. Since this operation is repeated many times during a moment, it is possible to allow water to extremely efficiently contain active oxygen species therein. Further, the titania coated alumina fiber aggregate has a large number of free fiber ends and it is possible to diffuse a large quantity of active oxygen species by vibrating these free fiber ends.

Along with such structure, in the titania fibers which form the titania coated alumina fiber aggregate, an aluminum layer made of aluminum-based metal, an alumina layer which includes a natural oxide film, an artificial oxide film and a deep-layer oxide film, and a titania layer which is formed by using a sol A liquid, a sol B liquid or a sol C liquid are firmly bonded to each other and hence, the titania coated alumina fiber aggregate exhibits high durability whereby the titania coated alumina fiber aggregate can withstand the use thereof for a long period while maintaining practical utility even in water under the ultrasonic wave environment.

The photocatalytic reaction water generated in such a manner is effective for disinfection cleaning of goods, foods and organisms and, at the same time, a strong acidity of the photocatalytic reaction water is used for an anti-parasitic operation of marine organisms or an anti-parasitic operation of amoeba.

(12) Example in which Titania Coated Alumina Fiber Aggregate is Applied to a Filter of an Air Purifier Conventionally, a gas (for example, a harmful gas such as formaldehyde or laughter gas ($N_2O$)) is constantly discharged from an experiment and research room, an operation room of a hospital, a factory, an excrement storage place or the like. However, it has been pointed out that the gas adversely influences not only a human health by bringing about a health problem such as chronic neurologic disease, liver disease, teratogenicity or carcinogenicity but also an environment by bringing about global warming or the ozone layer depletion. Accordingly, it is urgently necessary to cope with such drawbacks.

Further, the gas treatment system includes a water supply portion which supplies water to the gas treatment filter, and a water filter is formed on a surface of the gas treatment filter, and the gas treatment filter includes the titania coated alumina fiber aggregate manufactured by a method for manufacturing a titania coated alumina fiber aggregate according to the present invention.

A gas treatment system A is specifically explained in conjunction with drawings.

Figure 9:
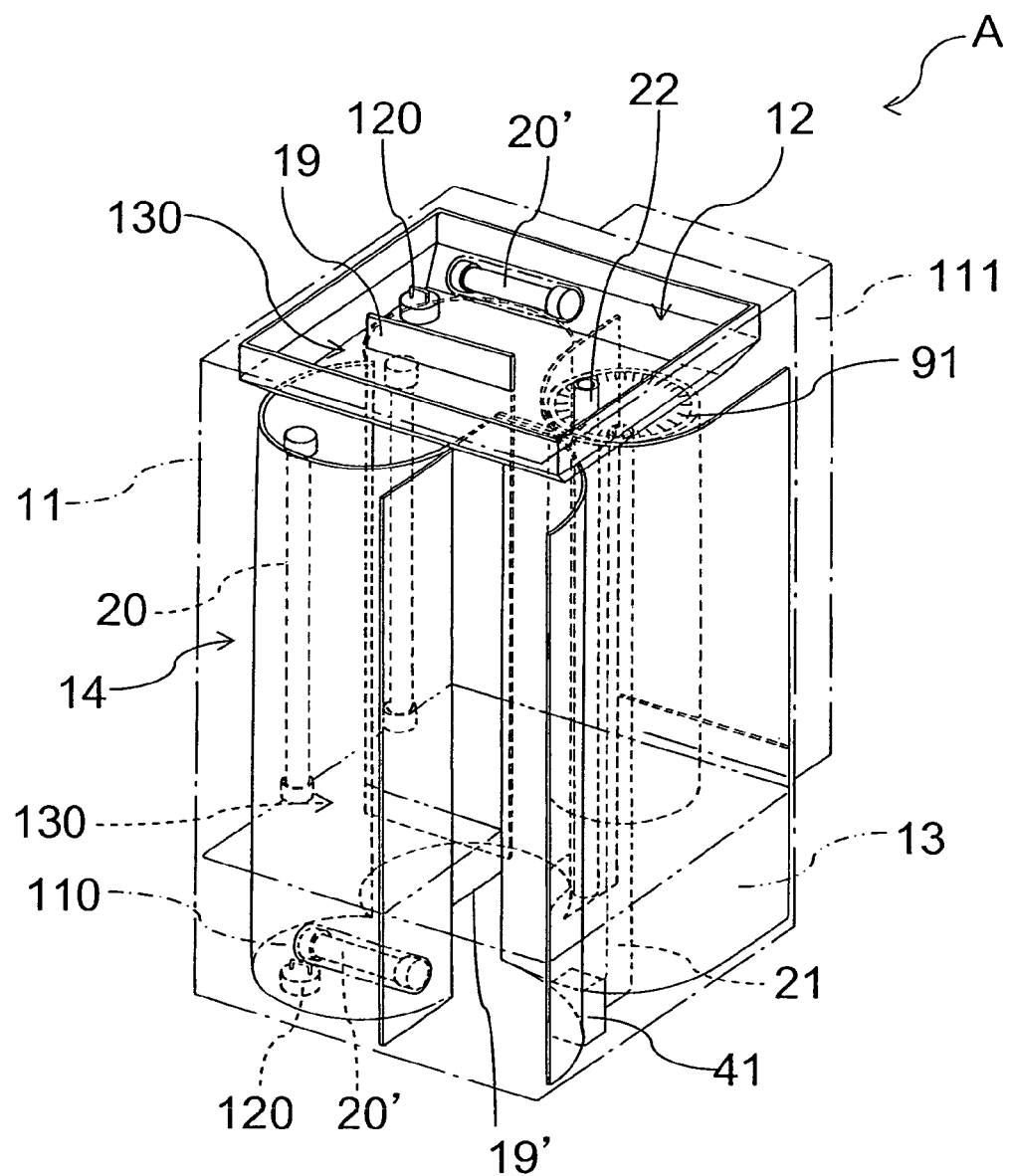
FIG. 9 is an overall perspective view of a gas treatment system according to the present invention.
Figure 10:
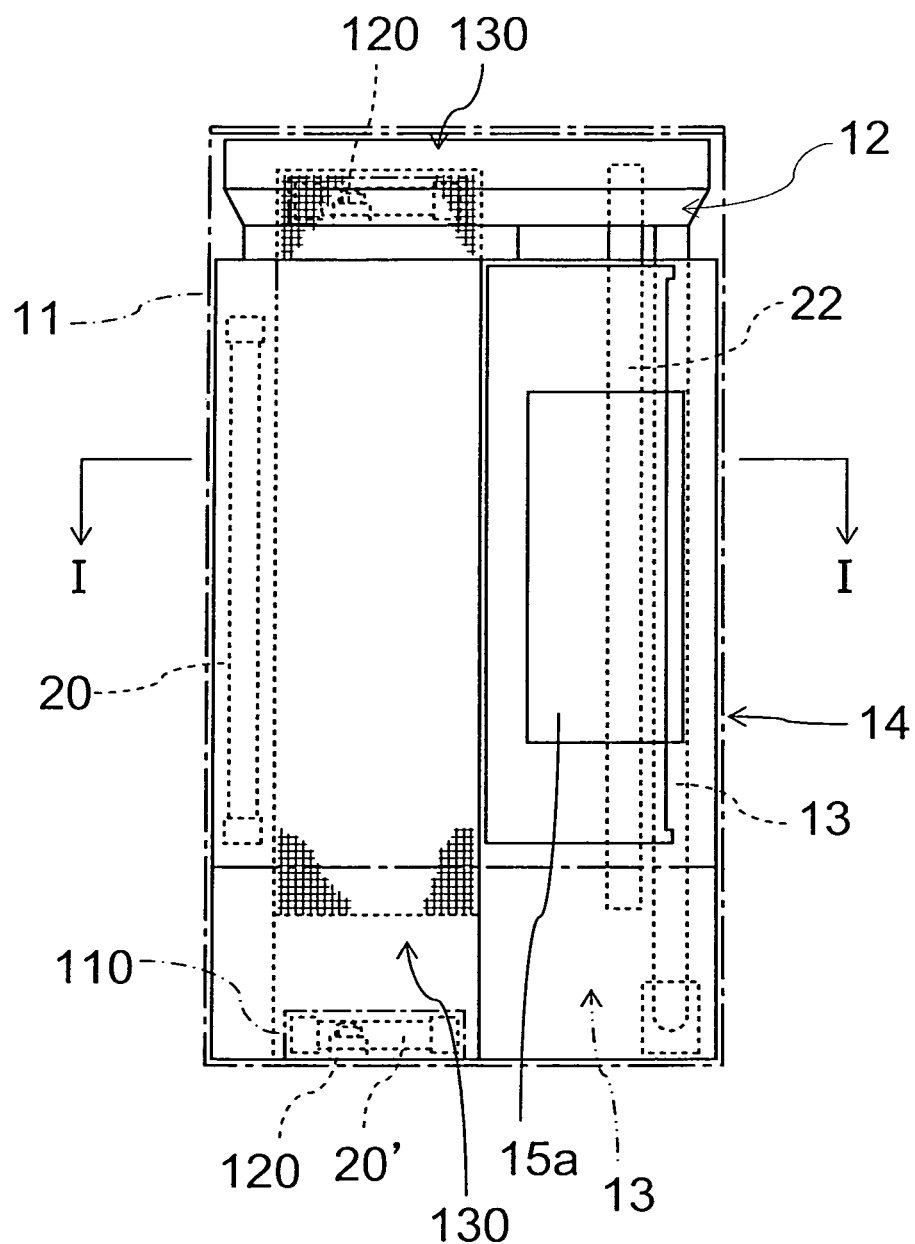
FIG. 10 is a front view of the gas treatment system according to the present invention.

As shown in FIG. 9 and FIG. 10, the gas treatment system A mounts a first water tank 12 on an upper portion of a casing 11, stores water in a lower portion in the inside of the casing 11, wherein the lower portion is referred to as a second water tank 13. Both water tanks 12, 13 store water for forming a water filter F described later. Further, the water filter F is formed of the alumina fiber aggregate or the titania coated alumina fiber aggregate.

Between the first water tank 12 and the second water tank 13, a water supply pipe 21 is provided as a water supply means. Water stored in the inside of the second water tank 13 is pumped up by a water supply pump 41 which is arranged in the inside of the second water tank 13 as a water supply means in the same manner as the water supply pipe 21 and is sucked up and is supplied to the first water tank 12 by way of the water supply pipe 21.

Here, as shown in FIG. 10, in the inside of the first water tank 12 and the second water tank 13, a photocatalyst portion 130 is formed by arranging a gas treatment filter which includes the titania coated alumina fiber aggregate and, at the same time, an ultrasonic vibrator 120 which is connected with an ultrasonic wave generator (not shown in the drawing) and an ultraviolet ray lamp 20' are arranged in the inside of the first water tank 12 and the second water tank 13. Accordingly, it is possible to decompose harmful substances caught by the water filter and the sterilization of bacteria generated in the water filter system. Ultraviolet rays served for radiation may not be limited only to ultraviolet rays from a blacklight (wavelength: approximately 340 nm to 370 nm) but also may be ultraviolet rays from a sterilizing lamp (wavelength: approximately 260 mm).

Figure 11:
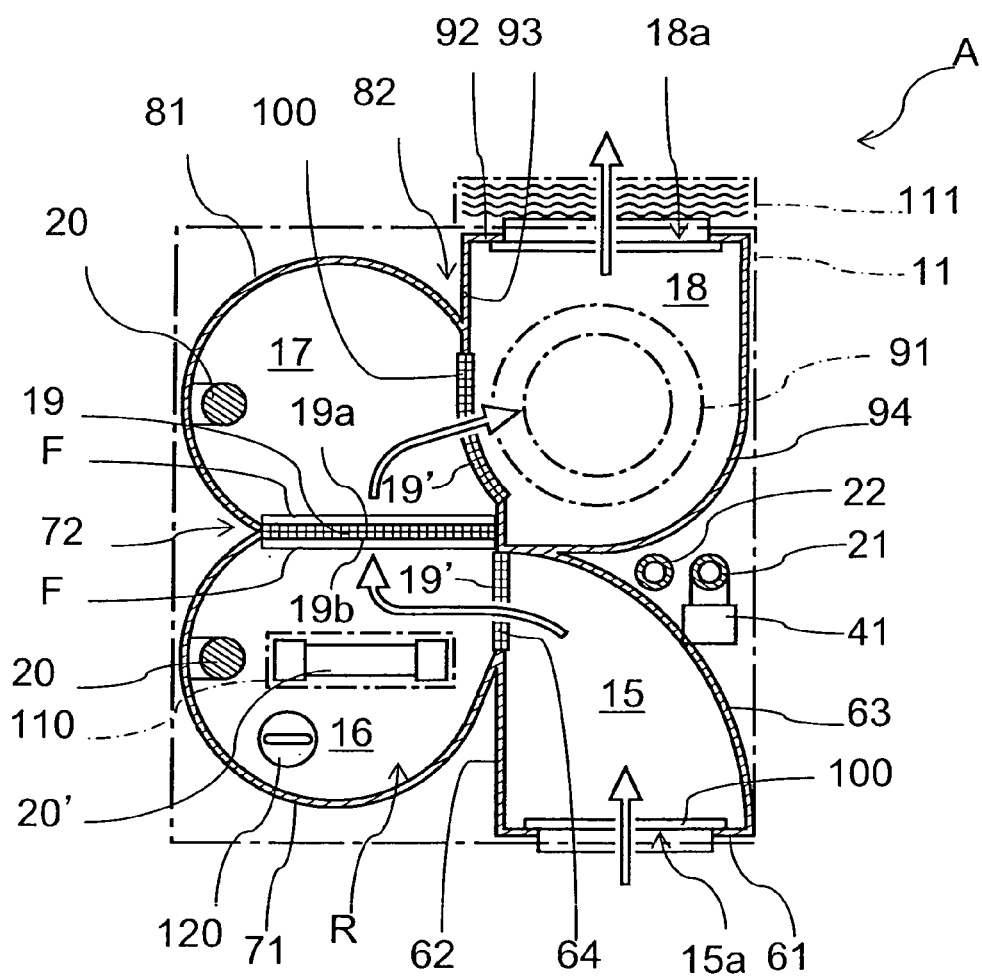
FIG. 11 is a cross-sectional view taken along a line I-I in FIG. 10.
Figure 12:
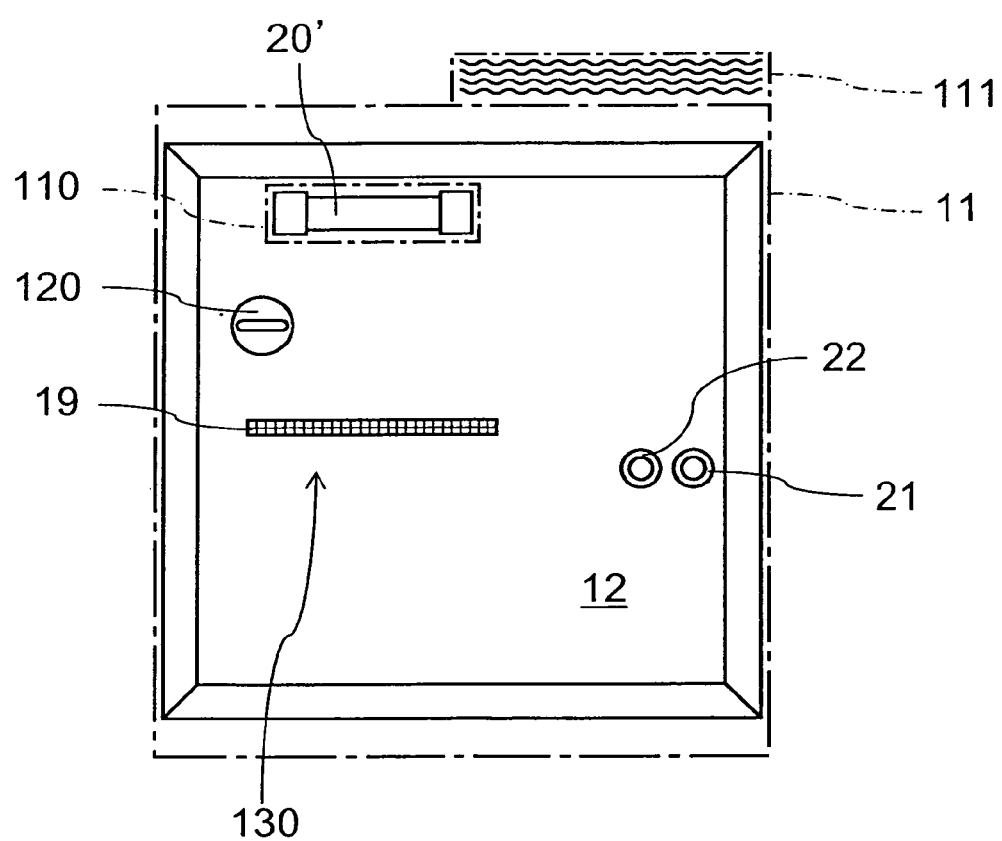
FIG. 12 is an explanatory view showing the constitution of the inside of a first water tank.

In the gas flow passage portion 14, as shown in FIG. 11, a flow passage R which allows a gas to flow by way of an air supply passage 15→a mirror face air-blow chamber 16→a mirror face air exhaust chamber 17→an air exhaust passage 18→a carbon fiber accommodating chamber 111 is formed. By mounting the above-mentioned exhaust port 18a in the carbon fiber accommodating chamber 111, using active carbon fibers as a catalyst and an absorbent, harmful substances in the gas which cannot be treated in the above-mentioned gas flow passage portion 14 (for example, nitrogen compound in the organic gas) is subject to absorption and reduction treatment in the inside of the carbon fiber accommodating chamber 111 and, thereafter, the gas is exhausted thus enhancing the gas treatment efficiency.

In this manner, by radiating the ultraviolet rays to the gas treatment filter 19 which is formed by applying titania coating to the alumina fiber, it is possible to perform the gas treatment using not only the active oxygen species generated on the surface of the gas treatment filter 19 but also photocatalytic reaction water generated in the inside of the upper and lower tanks as a medium.

Accordingly, different from the conventional method which treats only harmful substances which are brought into contact with the surface of the photocatalyst by directly bringing the active oxygen species generated by the photocatalyst (titania coating) on the surface of the gas treatment filter 19 to the harmful substances without using a medium, the gas treatment effect by the active oxygen species can be enjoyed even at a place remote from the photocatalyst.

The same goes for splashes of water containing the active oxygen species which are diffused in an aerosol state in the inside of a flow passage R of the gas treatment system A. Even when the harmful substances to be treated are not brought into direct contact with the gas treatment filter, the oxidizing decomposition ability is imparted to fine water droplets which are present in the inside of the flow passage R and hence, the gas treatment efficiency can be remarkably enhanced.

Further, in the first water tank 12, for example, a calcium carbonate containing material (not shown in the drawing) which contains calcium carbonate ($CaCO_3$) such as baked coral or Ryukyu limestone may be arranged so as to convert water in the inside of the first water tank 12 into a calcium carbonate solution.

Further, urea may be added to water in the inside of the first water tank 12.

Accordingly, it is possible to maintain the absorption ability of water filter F by suitably forming harmful substances in the gas into gypsum by while further enhancing the absorption ability of the water filter F.

Here, in FIG. 9 to FIG. 12, symbol 15a indicates an air intake port, symbol 19a indicates a front surface, symbol 19b indicates a rear surface, symbol 20a indicates a rear surface, symbol 21 indicates a water supply pipe, symbol 22 indicates a water discharge pipe, symbol 41 indicates a water supply pump, symbol 61 indicates an air-discharge-passage front wall, symbol 62 indicates an air-discharge-passage left wall, symbol 63 indicates an air-discharge-passage peripheral wall, symbol 64 indicates a first connecting portion, symbol 71 indicates a mirror-surface-air-supply-chamber peripheral wall, symbol 72 indicates a second connecting portion, symbol 81 indicates a mirror-surface-air-discharge-chamber peripheral wall, symbol 82 indicates a third connecting portion, symbol 91 indicates a fan, symbol 92 indicates an air-discharge-passage rear wall, symbol 93 indicates an air-discharge-passage left wall, symbol 94 indicates an air-discharge-passage peripheral wall, and numeral 100 indicates a ultraviolet ray reflection aluminum panel.

As described above, the method for manufacturing a titania coated alumina fiber aggregate of the present invention includes the steps of: forming an aluminum fiber aggregate where a plurality of aluminum fibers made of aluminum and having a fiber length of 5 mm to 20 cm are stored and are pressed in a predetermined mold frame in a state where the aluminum fibers are entangled thus forming an aluminum fiber aggregate having a desired shape where the aluminum fibers are aggregated with density per unit volume of 0.5 $g/cm^3$ to 3 $g/cm^3$; forming an alumina fiber aggregate where the aluminum fiber aggregate is heated up to a temperature approximately half of a melting point of the aluminum while maintaining a temperature gradient of approximately 5° C. or less per minute and, thereafter, the alumina fiber aggregate is maintained at a temperature of approximately half of the melting point for 30 minutes to 3 hours so as to form an oxide film having a film thickness of 5 nm or more on the aluminum fibers and, thereafter, the aluminum fiber aggregate is heated up to a temperature close to a melting point thereof and, thereafter, the aluminum fiber aggregate is maintained around the temperature close to the melting point for 30 minutes to 12 hours thus forming the alumina fiber aggregate with the oxide film having a film thickness of 50 nm or more; and forming a titania coated alumina fiber aggregate where the alumina fiber aggregate is immersed in a sol liquid containing a titania compound, and is pulled up from the sol liquid, and the sol liquid adhered to surfaces of the alumina fibers which constitute the alumina fiber aggregate is dried and, thereafter, the alumina fibers are baked thus forming a titania thin film on the alumina fibers whereby the titania coated alumina fiber aggregate is manufactured. Due to such a manufacturing method, it is possible to manufacture a titania coated alumina fiber aggregate having a uniform and hardly peelable titania thin film which is suitable for a filter or a catalyst body.

Finally, although the explanation has been made heretofore with respect to the respective embodiments, it is needless to say that these embodiments merely constitute one example of the present invention and the present invention is not limited to the above-mentioned embodiments. That is, various modifications are conceivable depending on designs or the like without departing from the gist of the technical concept of the present invention. For example, in the air purifying system A shown in FIG. 9 to FIG. 12, only one gas treatment filter 19 which uses the titania coated alumina fiber aggregate is shown, the present invention is not limited to such a case and, for example, the air purifying system A may include a plurality of gas treatment filters 19'.

According to the method for forming an alumina coating film described in this embodiment, the aluminum fiber made of aluminum or aluminum alloy which has the surface thereof covered with the natural oxide film is prepared, the artificial oxide film is formed below the natural oxide film, and the deep-layer oxide film which is formed by oxidizing aluminum is further formed below the artificial oxide film.

Due to such a constitution, the artificial oxide film and the deep-layer oxide film can be continuously formed in the lower-layer direction of the natural oxide film which covers the surface of the aluminum fiber. Accordingly, the oxide film can acquire the three-layered structure thus enabling the formation of the oxide film to which coating having high adhesive property such as photocatalyst titania coating is applied. Further, using the deep-layer oxide film as a heat-resistant film, it is possible form the deepest-layer oxide film described later by heating the aluminum fiber up to the melting point or more.

Further, in the method for forming an alumina thin film described in this embodiment, the artificial oxide film is formed by heating the aluminum fiber up to the temperature which is approximately half of the melting point of aluminum and hence, at the time of forming the deep-layer oxide film described later by heating the aluminum fiber at the temperature which exceeds the approximately half of the melting point of aluminum, it is possible to form the deep-layer oxide film while preventing the collapsing the fiber shape.

Further, in the method for forming an alumina thin film described in this embodiment, the artificial oxide film is formed by heating the aluminum fiber while maintaining a temperature gradient of approximately 5° C. or less per minute and hence, it is possible to form the dense artificial oxide film whereby it is possible to form the deep-layer oxide film while further effectively preventing the collapsing the fiber shape.

Further, in the method for forming an alumina thin film described in this embodiment, the artificial oxide film is formed by heating the aluminum fiber up to the temperature approximately half of melting point of aluminum while maintaining a temperature gradient of approximately 5° C. or less per minute and, thereafter, by maintaining the temperature approximately half of the melting point for a predetermined time. Accordingly, the presence of irregularities in film thickness of the deep-layer oxide film can be prevented thus enabling the formation of the alumina thin film having the desired film thickness.

Further, in the method for forming an alumina thin film described in this embodiment, by setting the film thickness of the oxide film consisting of the natural oxide film and the artificial oxide film to 5 nm or more, it is possible to form the firm oxide film thus enhancing the weather resistance, the corrosion resistance and the stability of the fiber.

Further, in the method for forming an alumina thin film described in this embodiment, the deep-layer oxide film is formed by heating the aluminum fiber up to a temperature close to the melting point of aluminum after forming the artificial oxide film. Accordingly, oxygen in the heating atmosphere permeates the natural oxide film and the artificial oxide film and hence, it is possible to form the deep-layer oxide film while maintaining the fiber shape.

Further, in the method for forming an alumina thin film described in this embodiment, the film thickness of the oxide film consisting of the natural oxide film, the artificial oxide film and the deep-layer oxide film is set to 50 nm or more. Accordingly, it is possible to form the alumina fiber which possesses the flexibility intrinsic to aluminum and, at the same time, can maintain the fiber shape even when the heating temperature exceeds the melting point of aluminum. Further, it is possible to form the oxide film to which coating having high adhesive property such as photocatalyst titania coating can be applied. Still further, it is possible to form the alumina thin film which can withstand heat resistance capable of withstanding the heating temperature (approximately 750° C.) necessary for forming the film for the rutile-type photocatalytic titania fiber.

Further, in the method for forming an alumina thin film described in this embodiment, the deep-layer oxide film is formed by heating the aluminum fiber up to the temperature close to the melting point of aluminum corresponding to a desired film thickness and, thereafter, by adjusting the time for holding the aluminum fiber around the temperature. Accordingly, the film thickness of the deep-layer oxide film can be adjusted.

Further, in the method for forming an alumina thin film described in this embodiment, the deep-layer oxide film is configured to possess heat resistance against a temperature higher than a melting point of aluminum or aluminum alloy. Accordingly, it is possible to perform the further heating or elevation of temperature exceeding the melting point of aluminum or aluminum alloy.

Further, in the method for forming an alumina thin film described in this embodiment, the deepest-layer oxide film is formed by oxidizing aluminum below the deep-layer oxide film by heating the aluminum fiber up to the temperature which exceeds a melting point of the aluminum fiber. Accordingly, it is possible to form the alumina thin film which can withstand heat resistance capable of withstanding the heating temperature (approximately 750° C.) necessary for forming the film for the rutile-type photocatalytic titania fiber.

Further, in the method for forming an alumina thin film described in this embodiment, all of the artificial oxide film, the deep-layer oxide film and the deepest-layer oxide film are formed by heat ing in a vapor phase or under a high oxygen condition. Accordingly, different from a melting method which has been used conventionally as an oxidizing method, there is no possibility that aluminum fiber is melted and, at the same time, it is possible to surely oxidize the aluminum fiber at a low cost.

Further, according to an alumina fiber described in this embodiment, the alumina fiber which is formed by oxidizing the aluminum fiber made of aluminum or aluminum alloy which has a surface thereof covered with a natural oxide film also includes the artificial oxide film which is formed by oxidizing aluminum below the natural oxide film, and also includes the deep-layer oxide film which is formed by oxidizing aluminum below the artificial oxide film. Accordingly, the oxide film can acquire the three-layered structure thus producing the alumina fiber having the oxide film to which coating having high adhesive property such as photocatalyst titania coating can be applied. Further, using the deep-layer oxide film as a heat-resistant film, it is possible to form the alumina fiber having the deepest-layer oxide film described later by heating the aluminum fiber up to the melting point or more.

Further, according to an alumina fiber described in this embodiment, the artificial oxide film is formed by heating the aluminum fiber up to a temperature which is approximately half of a melting point of aluminum and hence, at the time of forming the deep-layer oxide film described later by heating the aluminum fiber at the temperature which exceeds the approximately half of the melting point of aluminum, it is possible to form the alumina fiber on which the deep-layer oxide film can be formed while preventing the collapse of the fiber shape.

Further, according to an alumina fiber described in this embodiment, the artificial oxide film is formed by heating the aluminum fiber while maintaining a temperature gradient of approximately 5° C. or less per minute and hence, it is possible to form the alumina fiber to which the deep-layer oxide film is formed while further effectively preventing the collapse of the fiber shape at the time of forming the deep-layer oxide film.

Further, according to an alumina fiber described in this embodiment, the artificial oxide film is formed by heating the aluminum fiber up to a temperature approximately half of melting point of aluminum while maintaining a temperature gradient of approximately 5° C. or less per minute and, thereafter, by maintaining the temperature approximately half of the melting point for a predetermined time. Accordingly, the presence of irregularities in film thickness of the deep-layer oxide film can be prevented thus enabling the formation of the alumina thin film having the desired film thickness.

Further, according to an alumina fiber described in this embodiment, a film thickness of the oxide film consisting of the natural oxide film and the artificial oxide film is 5 nm or more. Accordingly, it is possible to form the firm oxide film thus forming the alumina fiber which can enhance the weather resistance, the corrosion resistance and the stability of the fiber.

Further, according to an alumina fiber described in this embodiment, the deep-layer oxide film is formed by heating the aluminum fiber up to a temperature close to a melting point of aluminum after forming the artificial oxide film. Accordingly, the deep-layer oxide film is formed below the artificial oxide film and hence, it is possible to form the alumina fiber to which coating having high adhesive property such as photocatalyst titania coating can be applied. Further, by heat ing the aluminum fiber using the deep-layer oxide film as the heat resistant film up to the melting point or more, it is possible to form the alumina fiber which can form the deepest-layer oxide film described later.

Further, according to an alumina fiber described in this embodiment, the film thickness of an oxide film consisting of the natural oxide film, the artificial oxide film and the deep-layer oxide film is 50 nm or more. Accordingly, it is possible to form the alumina fiber which possesses the flexibility intrinsic to aluminum and, at the same time, can maintain the fiber shape even when the heating temperature exceeds the melting point of aluminum. Further, it is possible to form the oxide film to which coating having high adhesive property such as photocatalyst titania coating can be applied. Still further, it is possible to form the alumina fiber which can withstand heat resistance capable of withstanding the heating temperature (approximately 750° C.) necessary for forming the film for the rutile-type photocatalytic titania fiber.

Further, according to an alumina fiber described in this embodiment, the deep-layer oxide film is formed by heating the aluminum fiber up to a temperature close to a melting point of aluminum and, thereafter, by adjusting a time for holding the aluminum fiber around the temperature corresponding to a desired film thickness. Accordingly, the film thickness of the deep-layer oxide film can be adjusted.

Further, according to an alumina fiber described in this embodiment, the deep-layer oxide film is configured to possess heat resistance against a temperature higher than a melting point of aluminum or aluminum alloy. Accordingly, the further heating and temperature elevation can be performed.

Further, according to an alumina fiber described in this embodiment, the deepest-layer oxide film is formed by oxidizing aluminum below the deep-layer oxide film by heating the aluminum fiber up to a temperature which exceeds a melting point of the aluminum fiber. Accordingly, it is possible to form the alumina fiber which can withstand heat resistance capable of withstanding the heating temperature (approximately 750° C.) necessary for forming the film for the rutile-type photocatalytic titania fiber.

Further, according to an alumina fiber described in this embodiment, all of the artificial oxide film, the deep-layer oxide film and the deepest-layer oxide film are formed by heating in a vapor phase or under a high oxygen condition. Accordingly, different from a melting method which has been used conventionally as an oxidizing method, it is possible to surely form the uniform alumina fiber at a low cost without using a large quantity of chemicals or the like as in the case of a melting method.

Further, according to an alumina fiber described in this embodiment, a surface of the alumina fiber is covered with a titania thin film and hence, it is possible to impart the photocatalytic ability to the alumina fiber and, at the same time, it is possible to enhance the heat resistance, the adhesiveness and the durability of the alumina fiber. Still further, it is possible to impart the high hydrophilicity and the high water retentiveness to the alumina fiber.

Further, according to an alumina fiber described in this embodiment, the titania thin film is derived from titanalkoxide group, halogenated titanium or titanate and hence, the alumina fiber can favorably generate the photocatalytic action attributed to the titania thin film.

Further, according to an alumina fiber described in this embodiment, the titanalokoxide group is titanium tetraethoxide or titanium tetra isopropoxide, the halogenated titanium is tetrachloride, and titanate is any one of tri-titanates, tetra-titanates and penta-titanates. Accordingly, the alumina fiber can more favorably generate the photocatalytic action attributed to the titania thin film.

Further, according to an alumina fiber described in this embodiment, the aluminum fibers are aggregated and hence, it is possible to form the alumina fiber having a large surface area with a compact volume.

Further, according to a photocatalytic reaction water generating system described in this embodiment, in the photocatalytic reaction water generating system which is capable of imparting a function of active oxygen species to water by diffusing active oxygen species in water generated by radiating light from a light source to a photocatalyst body and thus performing washing by making use of an oxidation reaction with the resulting water, the photocatalytic body includes the alumina fiber described in any one of claims 23 to 25. Accordingly, the photocatalytic reaction water generating system can efficiently diffuse the active oxygen species in water and hence, it is possible to efficiently produce the photocatalytic reaction water.

Further, according to the gas treatment system described in this embodiment, the gas treatment system includes a water supply portion which supplies water to the gas treatment filter, and water filter is formed on a surface of the gas treatment filter, and the gas treatment filter includes the alumina fiber described in any one of claims 11 to 26. Accordingly, it is possible to surely treat the gas using the gas treatment filter and the water filter.

What is claimed is:

1. A method for manufacturing a titania coated alumina fiber aggregate comprising the steps of:
    forming an aluminum fiber aggregate where a plurality of aluminum fibers made of aluminum and having a fiber length of 5 mm to 20 cm are stored and are pressed in a predetermined mold frame in a state where the aluminum fibers are entangled thus forming an aluminum fiber aggregate having a desired shape where the aluminum fibers are aggregated with density per unit volume of 5 g/cm$^3$ to 3 g/cm$^3$;
    forming an alumina fiber aggregate where the aluminum fiber aggregate is heated up to a temperature approximately half of a melting point of the aluminum while maintaining a temperature gradient of approximately 5° C. or less per minute and, thereafter, the alumina fiber aggregate is maintained at a temperature of approximately half of the melting point for 30 minutes to 3 hours so as to form an oxide film having a film thickness of 5 nm or more on the aluminum fibers and, thereafter, the aluminum fiber aggregate is heated up to a temperature close to a melting point thereof and, thereafter, the aluminum fiber aggregate is maintained around the temperature close to the melting point for 30 minutes to 12 hours thus forming the alumina fiber aggregate with the oxide film having a film thickness of 50 nm or more; and
    forming a titania coated alumina fiber aggregate where the alumina fiber aggregate is immersed in a sol liquid containing 15 to 25 weight % of titanium diisopropoxybis(acetylacetonate), 5 to 10 weight % of isopropyl alcohol, 55 to 75 weight % of ethanol and 5 to 10 weight % of water, and is pulled up from the sol liquid, and the sol liquid adhered to surfaces of the alumina fibers which constitute the alumina fiber aggregate is dried and, thereafter, the alumina fibers are baked thus forming a titania thin film on the alumina fibers whereby the titania coated alumina fiber aggregate is manufactured.

2. A method for manufacturing a titania coated alumina fiber aggregate according to claim 1, wherein the immersion of the alumina fiber aggregate in the sol liquid is performed in a hermetically-sealed vessel having a volume larger than a volume of the stored sol liquid using the sol liquid at a temperature of 35° C. to 60° C., and the alumina fiber aggregate is immersed while allowing alcohol contained in the sol liquid to volatilize thus increasing a pressure of a gas phase in the hermetically-sealed vessel.

3. A method for manufacturing a titanic coated alumina fiber aggregate according to claim 2, wherein a mixing ratio of titanium diisopropoxybis(acetylacetonate), ethanol and water in the sol liquid is set to 3.5:9:1.

* * * * *